(12) United States Patent
Liceaga et al.

(10) Patent No.: US 12,575,589 B2
(45) Date of Patent: Mar. 17, 2026

(54) CHIA SEED DERIVED PRODUCTS AND THE PROCESS THEREOF

(71) Applicant: Purdue Research Foundation, West Lafayette, IN (US)

(72) Inventors: Andrea M. Liceaga, Lafayette, IN (US); José Eleazar Aguilar Toalá, Texcoco (MX); Uriel Urbizo-Reyes, Boston, MA (US)

(73) Assignee: Purdue Research Foundation, West Lafayette, IN (US)

( * ) Notice: Subject to any disclaimer, the term of this patent is extended or adjusted under 35 U.S.C. 154(b) by 256 days.

(21) Appl. No.: 18/387,056

(22) Filed: Nov. 6, 2023

(65) Prior Publication Data

US 2024/0415155 A1     Dec. 19, 2024

Related U.S. Application Data

(62) Division of application No. 17/118,695, filed on Dec. 11, 2020, now Pat. No. 11,805,795.

(60) Provisional application No. 62/947,125, filed on Dec. 12, 2019.

(51) Int. Cl.
| | |
|---|---|
| *A23L 25/00* | (2016.01) |
| *A23L 5/30* | (2016.01) |
| *A23L 33/115* | (2016.01) |
| *A23L 33/18* | (2016.01) |
| *A23L 33/22* | (2016.01) |

(52) U.S. Cl.
CPC ............... *A23L 25/30* (2016.08); *A23L 5/32* (2016.08); *A23L 33/115* (2016.08); *A23L 33/18* (2016.08); *A23L 33/22* (2016.08)

(58) Field of Classification Search
None
See application file for complete search history.

(56) References Cited

PUBLICATIONS

Sandoval-Oliveros. Isolation and Characterization of Proteins from Chia Seeds (*Salvia hispanica* L.); © 2012 American Chemical Society (Year: 2012).*
Grancieri. Chia Seed (*Salvia hispanica* L.) as a Source of Proteins, and Bioactive Peptides with Health Benefits: A Review; Feb. 2019; Comprehensive Reviews in Food Science and Food Safety 18(10) (Year: 2019).*
Aguilar-Toalá. Identifcation of chia seed (*Salvia hispanica* L.) peptides with enzyme inhibition activity towards skin-aging enzymes; published online: Jul. 30, 2020; © Springer-Verlag GmbH Austria, part of Springer Nature 2020 (Year: 2020).*

* cited by examiner

*Primary Examiner* — Patricia A George
*Assistant Examiner* — Lark Julia Moreno
(74) *Attorney, Agent, or Firm* — Purdue Research Foundation

(57) ABSTRACT

The present application relates generally to a process of manufacturing a plurality of products from chia seeds. The process comprises socking chia seeds in a large volume of water for a period of time followed by sonication at an elevated temperature to remove the soluble fiber, the mucilage of chia seeds using vacuum filtration. The oil component is extracted from mucilage removed chia seeds and the leftover is hydrolyzed in presence of an enzyme to afford a product of protein hydrolysates and a product of insoluble fiber of chia seeds. Both the process and the products are within the scope of this application.

7 Claims, 13 Drawing Sheets
Specification includes a Sequence Listing.

FIG. 1B                  FIG. 1C

APHWYTN

DQNPRSF

GDAHWTY

GDAHWVY

KKLKRVYV

GDAHWAY

GFEWITF

CHIA SEED DERIVED PRODUCTS AND THE PROCESS THEREOF

CROSS-REFERENCE TO RELATED APPLICATION

The present U.S. Patent Application is a divisional of U.S. patent application Ser. No. 17/118,695, now U.S. Pat. No. 11,805,795, filed Dec. 11, 2020, which relates to and claims the priority benefit of U.S. Provisional Application Ser. No. 62/947,125, filed Dec. 12, 2019, the contents of which are hereby incorporated by reference in their entirety.

SEQUENCE LISTING STATEMENT

A computer-readable form (CRF) of the Sequence Listing is submitted with this application. The file, entitled 68853-03_Seq_Listing.xml generated on Jan. 5, 2024 (8 KB), is the same in content as the previously generated file 68853-02_Seq_Listing.txt generated on Dec. 2, 2020. Applicant states that the content of the computer-readable form is the same and the information recorded in computer readable form is identical to the written sequence listing the contents of which are hereby incorporated by reference in their entirety.

TECHNICAL FIELD

The present application relates generally to a process of manufacturing a plurality of products from chia seeds, comprising oil, soluble fibers, insoluble fibers, protein hydrolysates, and series small biological active peptides. Both the process and the products are within the scope of this application.

BACKGROUND AND SUMMARY

This section introduces aspects that may help facilitate a better understanding of the disclosure. Accordingly, these statements are to be read in this light and are not to be understood as admissions about what is or is not prior art.

Chia (*Salvia hispanica*) has gained popularity due to its high nutritional content. Unfortunately, mucilage surrounding the chia seed (CS) limits the technological utilization of the protein. This study evaluated the bioactivity and functionality of CS protein hydrolysates (CSPH) produced by different treatments and a control (unhydrolyzed CS protein). Ultrasonication was used to separate mucilage from CS (7.8% yield). Proteins in defatted-CS flour were enzymatically hydrolyzed using conventional (enzymatic hydrolysis with alcalase) or sequential (enzymatic hydrolysis with alcalase+flavourzyme), and under water bath or microwave-assisted hydrolysis. CSPH from the sequential hydrolysis with microwave treatment showed superior (p<0.05) in vitro antioxidant activity. A positive correlation (p<0.05) was established between antioxidant assays and cellular antioxidant activity. The highest (p 0.05) cellular antioxidant activity was achieved by the sequential (94.76±1.96) and conventional (93.13±1.07) hydrolysis with microwave. Dipeptidyl peptidase-V inhibition (p<0.05) was higher for sequential hydrolysis with water bath. Inhibition of angiotensin converting enzyme activity increased (p<0.05) with hydrolysis for all treatments compared to the control. Regarding functionality, sequential hydrolysis with microwave showed higher (p<0.05) solubility at lower pH (3 and 5), while conventional hydrolysis with microwave was better at pH 7 and 9. Emulsification properties and foaming capacity were also higher in conventional hydrolysis with microwave, but conventional hydrolysis with water bath was more stable for foaming properties only. Results show that ultrasonication efficiently separated mucilage from chia seeds. Microwave and enzymatic hydrolysis can generate protein hydrolysates with improved bioactivity and functionality.

DRAWINGS AND BRIEF DESCRIPTIONS

FIG. 1A is a diagram of mucilage separation (extraction) from chia seeds using ultrasonication and vacuum-assisted filtration (FIG. 1A); FIG. 1B is a photograph of clean chia seeds after mucilage extraction using ultrasound and vacuum-filtration separation (FIG. 1B); FIG. 1C is a photograph of chia seeds with residual mucilage using ultrasound and centrifugation (FIG. 1C).

FIGS. 2A-2C shows results for solubility (FIG. 2A), emulsifying activity (FIG. 2B) and foaming capacity (FIG. 2C) of chia seed protein hydrolysates. Different letters (a-d) show significant differences (p<0.05) between treatments. Sample codes descriptions are provided in Table 1.

FIG. 3 shows molecular weight distribution of chia seed protein hydrolysates. Lanes indicate: (Lang 1) molecular weight markers, (Lang 2) Control: unhydrolyzed chia seed flour (Lang 3) A-WB: chia seed protein hydrolyzed by alcalase enzyme using water bath heating method. (Lang 4) A-MW: chia seed protein hydrolyzed by alcalase enzyme using microwave-assisted hydrolysis. (Lang 5) AF-WB: chia seed protein sequentially hydrolyzed by alcalase and flavourzyme enzymes using water bath heating method. (Lang 6) AF-MW: chia seed protein sequentially hydrolyzed by alcalase and flavourzyme enzymes using microwave-assisted hydrolysis.

FIG. 4 describes a general process for manufacturing a plurality of products from chia seeds.

FIG. 5 depicts enzyme-inhibition activity and IC50 values of the <3 kDa peptide fraction towards collagenase, hyaluronidase, tyrosinase, and elastase. The inhibitory activity of the peptide fraction was assayed at 1 mg/mL and the IC50 (peptide concentration (mg/mL) required for 50% of enzyme inhibition) was calculated using three different peptide concentrations (1, 1.5, and 2 mg/mL). Values shown are mean of triplicate determinations. Different lowercase (a-d) and uppercase (A-C) letters indicate statistical differences among IC50 values and % of enzyme inhibition, respectively FIGS. 6A-6D depict Lineweaver-Burk plots of the inhibitory patterns of the <3 kDa chia seed peptide fraction on (FIG. 6A) elastase, (FIG. 6B) collagenase, (FIG. 6C) hyaluronidase, and (FIG. 6D) tyrosinase, where 1/[V] and 1/[S] represent the reciprocal of velocity and substrate, respectively FIG. 7 shows size-exclusion chromatogram profile obtained from the <3 kDa peptide fraction of chia seed hydrolysates FIG. 8A-G Depicts predicted models of interactions between elastase and each peptide sequence obtained from the F-II chia seed peptide fraction. In each figure, the left model depicted represents the best accuracy predicted model for elastase (shown in white/multicolor) and peptide interaction (shown in red). The right model depicted represents the hydrogen bonding between elastase (pink) and the peptide sequence tested (blue). The amino acids involved in hydrogen bonding between the elastase and peptide are depicted in green color. The amino acid sequence of the peptide tested is shown at the top of each figure of two models depicted where FIG. 8A APHWYTN; FIG. 8B DQNPRSF; FIG. 8C GDAHWTY; FIG. 8D GDAHWVY; FIG. 8E KKLKRVYV; FIG. 8F GDAHWAY; FIG. 8G GFEWITF.

DETAILED DESCRIPTION

Figure 1A:
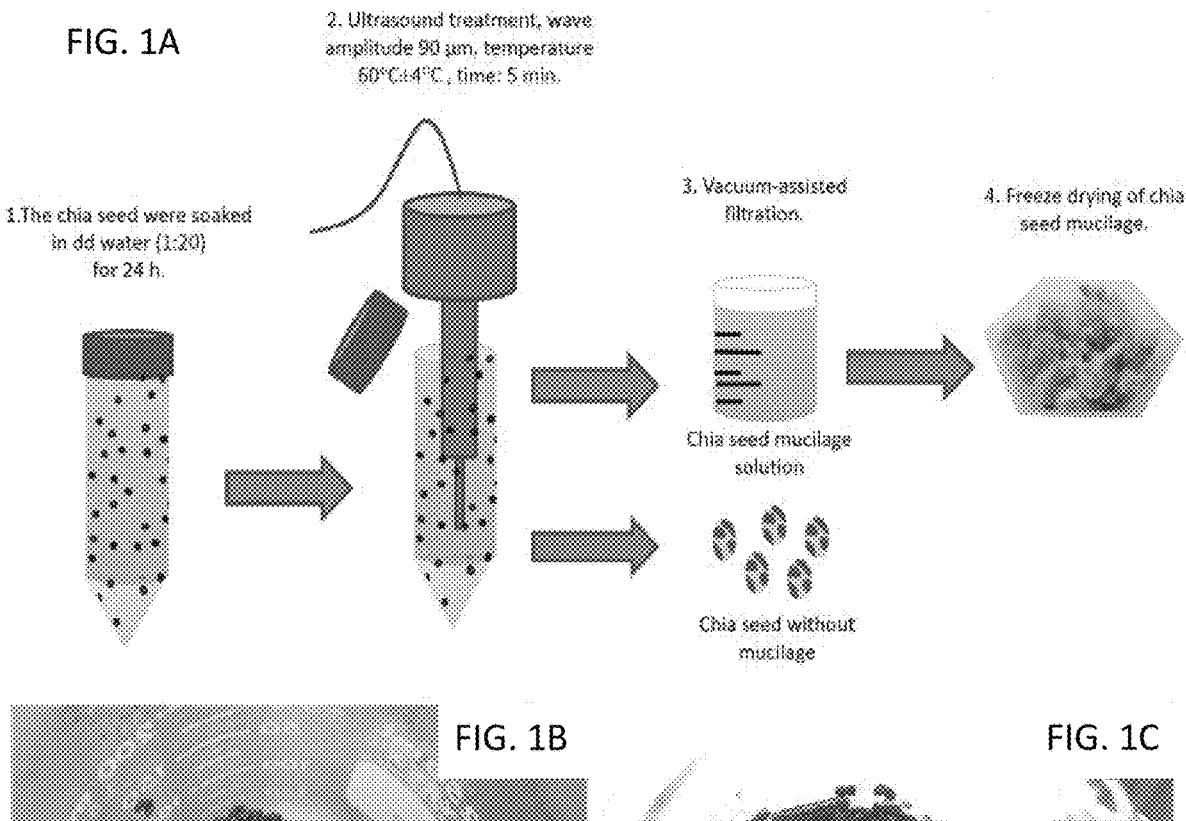

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

As used herein, the following terms and phrases shall have the meanings set forth below. Unless defined otherwise, all technical and scientific terms used herein have the same meaning as commonly understood to one of ordinary skill in the art.

In the present disclosure the term "about" can allow for a degree of variability in a value or range, for example, within 20%, within 10%, within 5%, or within 1% of a stated value or of a stated limit of a range.

In the present disclosure the term "substantially" can allow for a degree of variability in a value or range, for example, within 80%, within 90%, within 95%, or within 99% of a stated value or of a stated limit of a range. Soy and soybean are used exchangeably herein.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In some illustrative embodiments, this disclosure relates to a process for manufacturing a plurality of products from chia seeds comprising the steps of:

a. socking chia seeds in about 10 to 20 volumes of water for a period of time;

b. sonicating soaked chia seeds using 75% power input for about 5 minutes at an elevated temperature to afford a mixture;

c. separating chia seeds from said mixture by vacuum filtration to afford a solution, which is lyophilized to afford a mucilage product of chia seeds, a soluble fiber product;

d. drying mucilage-removed chia seeds; and e. extracting oil from dried chia seeds at an elevated temperature to afford an oil product and a flour of defatted chia seeds.

In some illustrative embodiments, this disclosure relates to a process for manufacturing a plurality of products from chia seeds as disclosed herein, wherein said process further comprising a step of hydrolyzing the flour of chia seeds in an aqueous solution in presence an enzyme at a pH of about 6~8.

In some illustrative embodiments, this disclosure relates to a process for manufacturing a plurality of products from chia seeds as disclosed herein, wherein said hydrolyzing step is a microwave-assisted hydrolyzing process.

In some illustrative embodiments, this disclosure relates to a process for manufacturing a plurality of products from chia seeds as disclosed herein, wherein said enzyme is alcalase with optional flavourzyme.

In some illustrative embodiments, this disclosure relates to a process for manufacturing a plurality of products from chia seeds as disclosed herein, wherein said hydrolyzing step affords a solid product and a solution product after separation, wherein said solid product is an insoluble fiber product of chia seed and said solution product is a protein hydrolysate of chia seeds.

In some illustrative embodiments, this disclosure relates to a process for manufacturing a plurality of products from chia seeds as disclosed herein, wherein said protein hydrolysate of chia seeds is further resolved into a plurality of fractions comprising biologically active proteins and peptides.

In some illustrative embodiments, this disclosure relates to a process for manufacturing a plurality of products from chia seeds as disclosed herein, wherein said active peptides have a sequence of APHWYTN (SEQ ID NO: 1), DQNPRSF (SEQ ID NO: 2), GDAHWAY, (SEQ ID NO: 3), GDAHWTY, (SEQ ID NO: 4), GDAHWVY (SEQ ID NO: 5), GFEWITF (SEQ ID NO: 6), KKLKRVYV (SEQ ID NO: 7), GDAHW (SEQ ID NO: 8), a salt or a derivative thereof.

A derivative is a compound that is derived from a similar compound by a chemical reaction, such as one atom or group of atoms is replaced with another atom or group of atoms. In this disclosure, a product of the C-terminal amidation or N-terminal acylation of those peptides disclosed herein are considered as a derivative of those peptides.

In some illustrative embodiments, this disclosure relates to a process for manufacturing a plurality of products from chia seeds as disclosed herein, wherein said oil product of chia seeds has a yield of about 30% weight of starting chia seeds.

In some illustrative embodiments, this disclosure relates to a process for manufacturing a plurality of products from chia seeds as disclosed herein, wherein said elevated temperature ranges from about 30° C. to about 70° C.

In some other illustrative embodiments, this disclosure relates to a product manufactured according to the process disclosed herein, wherein said product is an oil of chia seeds, a mucilage of chia seeds, a soluble fiber product, or a soluble protein hydrolysate.

In some other illustrative embodiments, this disclosure relates to a product manufactured according to the process disclosed herein, wherein said soluble protein hydrolysate comprises a peptide, a salt, a derivative or a fragment thereof, having a sequence of SEQ ID NOs: 1, 2, 3, 4, 5, 6, 7, or 8.

Yet in some other illustrative embodiments, this disclosure relates to a plurality of products of chia seeds manufactured according to a process comprising the steps of:

a. socking chia seeds in about 10-20 volumes of water for a period of time;

b. sonicating soaked chia seeds using 75% power input for about 5 minutes at an elevated temperature to afford a mixture;

c. separating chia seeds from said mixture by vacuum filtration to afford a solution, which is lyophilized to afford a mucilage product of chia seeds;

d. drying mucilage-removed chia seeds;

e. extracting oil from dried chia seeds at an elevated temperature to afford an oil product and a flour of defatted chia seeds; and f. hydrolyzing the flour of defatted chia seeds in an aqueous solution in presence an enzyme.

In some other illustrative embodiments, this disclosure relates to a plurality of products of chia seeds manufactured according to a process disclosed herein, wherein the step of hydrolyzing the flour of defatted chia seeds affords a solid product and a solution product after separation, wherein said solid product is an insoluble fiber product of chia seed and said solution product is a protein hydrolysate of chia seeds.

In some other illustrative embodiments, this disclosure relates to a plurality of products of chia seeds manufactured according to a process disclosed herein, wherein said hydrolyzing step is a microwave-assisted hydrolyzing process.

In some other illustrative embodiments, this disclosure relates to a plurality of products of chia seeds manufactured according to a process disclosed herein, wherein said enzyme is alcalase optionally together with flavourzyme.

In some other illustrative embodiments, this disclosure relates to a plurality of products of chia seeds manufactured according to a process disclosed herein, wherein said protein hydrolysate of chia seeds is further resolved into a plurality of fractions comprising active proteins and peptides.

In some other illustrative embodiments, this disclosure relates to a plurality of products of chia seeds manufactured according to a process disclosed herein, wherein said biologically active peptides have a sequence of SEQ ID NOs: 1, 2, 3, 4, 5, 6, 7, or 8.

In some other illustrative embodiments, this disclosure relates to a plurality of products of chia seeds manufactured according to a process disclosed herein, wherein said soluble protein hydrolysate comprises a peptide, a salt, a derivative or a fragment thereof, having a sequence of SEQ ID NOs: 1, 2, 3, 4, 5, 6, 7, or 8.

In some other illustrative embodiments, this disclosure relates to a plurality of products of chia seeds manufactured according to a process disclosed herein, wherein said elevated temperature ranges from about 30° C. to about 70° C.

In some other illustrative embodiments, this disclosure relates to a plurality of products of chia seeds manufactured according to a process disclosed herein, wherein said oil product of chia seeds has a yield of about 30% weight of starting chia seeds.

The present invention will become more clear in combination with the following exemplified embodiments.

The following non-limiting exemplary embodiments are included herein to further illustrate the invention. These exemplary embodiments are not intended and should not be interpreted to limit the scope of the invention in any way. It is also to be understood that numerous variations of these exemplary embodiments are contemplated herein.

Throughout the years, plants have been domesticated and cultivated to obtain novel potential ingredients and alternative sources of functional foods. One remarkable plant that has shown high potential is chia (*Salvia hispanica*). Chia is a biannually cultivated plant; it is considered a pseudo-cereal that produces purple and white flowers that eventually result in small oval shape seeds with sizes varying from 1 to 2 mm (Mohd Ali et al., 2012). The seeds are divided into two semi-hemispherical structures, which contain the endosperm, called cotyledons.

Nutritional composition (wet basis) of chia seed consists of protein (15-25%), lipids (30-33%), carbohydrates (26-41%), dietary fiber (18-30%) and minerals (4-5%) (Segura-Campos, Ciau-Solís, Rosado-Rubio, Chel-Guerrero, & Betancur-Ancona, 2014). Its composition allows the seed to have remarkable attributes such as a high content of protein, unsaturated ($\omega$-3) fatty acids, and dietary fiber (Segura-Campos et al., 2014). The high dietary fiber content of chia seeds can be observed when the seeds are soaked in water and a copious mucilaginous polysaccharide coating forms around the seed. This polysaccharide is present in micro-structures called collumnellas that surround the chia seed and allow the formation of this gel-like material that limits its digestibility and utilization (Muñoz, Cobos, Diaz, & Aguilera, 2012). The implementation of technologies such as ultrasound processing can aid in the separation of this polysaccharide, while allowing for protein extraction (Vilkhu, Mawson, Simons, & Bates, 2008). Ultrasound methods have shown high extraction yields in a shorter amount of time, for the separation of the polysaccharide from other plant matrices such as lingzhi mushrooms (*Ganoderma lucidum*) and mutamba seeds (*Guazuma ulmifolia* Lam) (Kang et al., 2019; Pereira et al., 2019).

A rising level of chronic diseases throughout the years have led to the development of food-derived bioactive peptides that can help improve these medical conditions. Some of the biological effects produced by these peptides are antioxidant, anti-inflammatory, anti-thrombotic, anti-hypertensive and anti-diabetic. Some proteins, including chia seed proteins, exhibit high resistance to proteolysis, limiting their applicability to generate bioactive peptides. For this reason, different hydrolysis treatments such as high-voltage, electrical (Mikhaylin, Boussetta, Vorobiev, & Bazinet, 2017) and microwave (Nguyen, Jones, Kim, San Martin-Gonzalez, & Liceaga, 2017) treatments have been proposed to increase the protein's susceptibility to hydrolysis.

Studies have shown the applicability and attributes of chia seeds. For example, one study showed how plasma $\alpha$-linolenic acid and eicosapentaenoic acid increased by 58% and 39%, respectively when chia seed was supplemented (25 g/day) in the diet of overweight women (Nieman et al., 2012). Another study by da Silva Marineli, Lenquiste, Moraes, and Maróstica Jr (2015), induced rats to overweight and oxidative stress before evaluating the effect of a diet rich in chia seeds on these conditions, showing how plasma and hepatic antioxidant capacity values increased. Sandoval-Oliveros and Paredes-López (2013) successfully incorporated chia seed into drinks to enhance the protein content.

The aim of this study was to improve the biological and functional properties of chia seed protein hydrolysates by using ultrasonication to remove the mucilage and microwave-assisted enzymatic hydrolysis to generate bioactive and functional chia seed peptides.

Materials and Methods

Chia seeds were obtained from Healthworks® (Scottsdale, AZ, USA). Alcalase® (protease from *Bacillus licheniformis*, EC 3.4.21.62) and Flavourzyme® (protease from *Aspergillus oryzae*, EC 232-752-2) were purchased from Sigma Aldrich (St. Luis, MO, USA). Human Dipeptidyl Peptidase IV (DPP-IV, ≥4500 units/µg protein) and substrate Gly-Pro p-nitroanilide hydrochloride, Angiotensin Converting Enzyme (ACE) from human and substrate Hippuryl-L-Histidyl-1-Leucine (HHL) were all purchased from Sigma Aldrich (St. Louis, MO, USA). Elastase enzyme (from porcine pancreas, Type IV), N-(methoxysuccinyl)-Ala-Ala-Pro-Val p-nitroanilide, Tyrosinase enzyme (from mushroom), 3,4-dihydroxy-L-phenylalanine, hyaluronic acid sodium salt (from Rooster comb), Hyaluronidase enzyme (from Bovine testes, Type I-S), Collagenase enzyme (from *Clostridium histolyticum*, Type IA), and N-[3-(2-furyl) acryloyl]-Leu-Gly-Pro-Ala, were purchased from Sigma-Aldrich (St. Louis, MO, USA). All chemicals used were reagent grade and generally obtained by three leading companies VWR International (Radnor, PA, USA), Sigma Aldrich (St. Louis, MO, USA) and Thermo Fisher Scientific (Waltham, MA, USA).

Chia Seed Mucilage Extraction

To extract the CS mucilage (FIG. 1A), seeds were hydrated in distilled water (1:20 ratio by weight) for 24 h, under refrigerated conditions. Preliminary studies helped develop an ultrasound treatment that offered successful mucilage separation. Hydrated seeds were pre-heated to 55±2° C., followed by sonication at a 75% power input using an ultrasonic cell disruptor (Sonifier® Branson S-150D Danbury, CT, USA). During sonication, the temperature increased to 60±4° C. due to molecular friction. This temperature was maintained constant using double walled beaker connected to an immersion circulator control Lauda E100 water bath (Lauda-Königshofen, Germany). Seed were separated using vacuum-assisted filtration.

Mucilage-free CS were dried using a tray dryer (Excalibur Dehydrator 3926TCDB, Sacramento, CA) held at 40° C. for 12 h. The weight of the seeds was measured to calculate mucilage extraction yield by weight difference [Eq. (1)]. Ultrasound mucilage extraction was compared to conventional extraction methods using drying oven and freeze-drying techniques following the methodology proposed by Campos, Ruivo, da Silva Scapim, Madrona, and Bergamasco (2016) and Capitani, Ixtaina, Nolasco, and Tomás (2013), respectively.

$$\% \text{ yield} = \frac{\text{(Weight of dry chia seeds} - \text{Weight of dry chia seeds without mucilage)}}{\text{Weight of dry chia seeds}} \times 100 \quad (1)$$

Chia Seed Oil Extraction

Dried, mucilage-free CS were defatted using a mechanical oil extraction method with a Beamnova Automatic Oil Press Machine (Commercial 304 Stainless Steel Expeller, Guangzhou, China). Seeds were pressed using a stainless-steel endless screw held at 37±2° C. The defatted chia seed was referred to as chia flour. Percentage of oil extraction was calculated by weight difference [Eq. (2)].

$$\text{yield } \% = 100 \times \frac{\text{(Weight of chia seeds} - \text{Weight of defatted chia seed flour)}}{\text{Weight of chia seeds}} \quad (2)$$

In addition, the crude protein content of the chia flour was determined using AOAC methods 984.13 (A-D) by A&L Greatlakes laboratories Facility (Fort Wayne, Indiana, USA).

Chia Seed Protein Hydrolysate (CSPH)

Chia flour was diluted in distilled water to obtain 22.5 mg protein/mL and homogenized using a Sorvall Omni Mixer homogenizer with a macro-attachment assembly (Norwalk, CT, U.S.A). The pH was adjusted to 8.0 using 2 M NaOH, which is the optimal condition for alcalase activity. Proteins were enzymatically hydrolyzed using single enzyme alcalase (A) or a sequential digestion with alcalase+flavourzyme (AF). Proteolysis occurred using conventional (WB) or microwave-assisted (MW) hydrolysis using a microwave accelerated reaction system (MDS, MARS-Xpress/230/60, CEM Corporation, USA). Treatments were denoted as conventional alcalase hydrolysis using a water bath (A-WB) and alcalase microwave-assisted hydrolysis (A-MW). Sequentially (AF) hydrolyzed treatments were coded as AF-WB (water bath hydrolysis) and AF-MW (microwave-assisted hydrolysis). Finally, the control (C) was non-hydrolyzed CS protein. Samples A-WB and A-MW were hydrolyzed for 1 h with 3% (w/w) Alcalase®. For sequential hydrolysis different times were used, due to the high efficiency of microwave-assisted hydrolysis the time was cut down by half to obtain similar degree of hydrolysis. AF-MW, the reaction was initiated with 2% (w/w) of Alcalase® for 45 min followed by addition of 2% (w/w) of Flavourzyme® for an additional 45 min. For AF-WB, the reaction was developed using 2% (w/w) of Alcalase® for 90 min followed by 2% (w/w) of Flavourzyme® for another 90 min. Hydrolysis was terminated by heating to 95±3° C. for 15 min.

Determination of the Degree of Hydrolysis

The degree of hydrolysis was calculated following the methodology of Adler-Nissen with slight modifications by Liceaga-Gesualdo and Li-Chan (1999), measuring spectrophotometrically the color formed by free amino groups reacting with Trinitrobenzenesulforonic acid (TNBS). The degree of hydrolysis (% DH) was defined as a percent ratio of the number of peptide bonds broken (h) to the total number of peptide bonds per unit weight (htot). The htot was calculated experimentally using the fully hydrolyzed chia seed flour, obtaining a value of 9.33 meq/g. The % DH was calculated using equation [Eq. (3)].

$$\% \text{ Degree of hydrolysis } (DH) = \frac{h}{h_{tot}} \times 100 \quad (3)$$

Amino Acid Analysis

Total amino acid composition of CSPH was analyzed by the method described by Hall, F. G., Jones, O. G., O'Haire, M. E., and Liceaga (2017) by UPLC Amino Acid Analysis Solution using the AccQ Tag Ultra Derivatization kit with UV detection (Water Corporations, Milford, MA, USA) by the Danforth Center's Proteomics and Mass Spectrometry Facility (St. Louis, Missouri, USA).

Sodium Dodecyl Sulfate Polyacrylamide Gel Electrophoresis (SDS-PAGE)

CSPH and control samples were dissolved to 2 mg/mL in zwitterionic-chaotrophic buffer according to Hall, Johnson, and Liceaga (2018) (2D-gel extraction buffer; 50 mM Tris-HCl, pH 8.8, 10 mM ethylenediaminetetraacetic acid (EDTA), 5 M urea, 2 M thiourea, 67 mM Dithiothreitol (DTT) and stirred for 1 h at room temperature. An aliquot (50 μL) was added to 50 μL Laemmeli sample buffer to obtain a 1 mg/mL final concentration of protein. A sample (20 μL) of this solution was loaded using 4-12% gradient gels (Bis-Tris, NuPAGE, ThermoScientific, Waltham, MA) and ran with MES SDS running buffer (NuPAGE, Thermo-Scientific, Waltham, MA) at 200 V for 45 min. The gel was stained overnight using Coomassie R-250 and destained overnight using a solution of 40% (v/v) methanol and glacial acetic acid. The molecular weight distribution of hydrolyzed peptides was determined using Precision plus Protein™ Dual Xtra Prestained Protein Standards (Biorad, Hercules, CA).

Bioactive Properties of CSPH

2-Diphenyl-2-picrylhydrazyl (DPPH) Radical Scavenging Activity

The scavenging activity of the CSPH was determined according to a method described by Bersuder, Hole, and Smith (1998) with modifications by Hall et al. (2018). CSPH and control (100 μL) were placed in a 96-well microplate to which 100 μL of (99.5%) ethanol and 25 μL of DPPH solution at a concentration of 0.05% (DPPH/ethanol, w/v) was added. The solution was incubated for 30 min at room temperature in dark conditions, and the absorbance measured at 550 nm using a microplate photometer. Radical reduction was expressed in mM TE/mg sample. Absorbance values were corrected using a sample blank prepared using 25 μL ethanol instead of DPPH solution.

2,2'-azino-bis (3-ethylbenzothiazoline-6-sulphonic acid) radical scavenging activity (ABTS). The ABTS radical scavenging activity was determined according to Ketnawa and Liceaga, (2017) with some modifications. A solution of 7 mM of ABTS was prepared in 2.45 mM of potassium persulphate and incubated at room temperature for 16 h. After 16 h the ABTS stock solution was diluted with distilled water to obtain an absorbance at 734 nm of 0.700±0.02. A CSPH sample aliquot (20 μL) was mixed with 980 μL ABTS solution and incubated in the darkness at 30° C. for 10 min, followed by absorbance reading at 734 nm. The ABTS scavenging activity was calculated by equation [Eq. (4)] and results expressed as mM Trolox equivalent (TE)/mg sample.

$$ABTS \text{ scavenging activity} = \tag{4}$$
$$\frac{(\text{Abs of control} - \text{Abs of the sample})}{(\text{Absorbance of control})} \times 100$$

Metal Ion Chelating (MIC)

The MIC capacity was done following the procedure by Ketnawa and Liceaga, (2017) with modifications. In a 96-well microplate, 200 μL of CSPH samples were mixed with 3.75 μL of 2 mM FeCl2 and 7.5 μL of 5 mM Ferrozine solution. Sample were incubated in the dark for 10 min at room temperature, and the absorbance was read at 522 nm. The MIC capacity was Calculated using the equation [Eq. (5)].

$$MIC \text{ ability} = \left[\frac{(\text{Abs control} - \text{Abs sample})}{(\text{Abs control})}\right] \times 100 \tag{5}$$

Oxygen Radical Absorbance Capacity (ORAC)

ORAC was measured according to a modified methodology described by Ou, Hampsch-Woodill, and Prior (2001). CSPH were diluted to a protein concentration of 0.05 mg/mL in a 75 mM sodium phosphate buffer at a pH of 7.4. The experiment was carried out in a 96-well microplate, each well containing a total volume of 205 μL 150 μL of Fluorescein (10 nM) was pre-incubated with 25 μL of CSPH sample solution for 15 min at 37° C. in dark conditions. Then the reaction was initiated by adding 30 μL of 2,2'-azobis(2-amidinopropane) dihydrochloride (AAPH) and the Fluorescence was measured using a spectrophotometer (Fluoroskan Ascent FL Microplate Fluorometer and Luminometer, Thermo Fisher Scientific, Massachusetts, United States) every 2 min for a total time of 90 min using an excitation wavelength of 485 nm and emission of wavelength 535 nm. The results were expressed in μM of Trolox Equivalent by measuring the fluorescein area decay through time (AUC). The values were calculated using the equation [Eq. (6)].

$$AUC = 1 + \frac{f_2}{f_0} + \frac{f_4}{f_0} + \frac{f_6}{f_0} + \frac{f_8}{f_0} + \dots f_{90}/f_0, \tag{6}$$

wherein $f_0$ represents the area under the curve at time 0 and fn the absorbance taken every minute.

Cellular Antioxidant Activity (CAA)

The CAA was evaluated following the methodology proposed by Malaypally et al. (2015) and Wan, Liu, Yu, Sun, and Li (2015). First, CSPH and control were solubilized in Dulbecco's modified Eagle's medium (DMEM)/high modified phenol red free. Caco-2 cells (100 μL, density of 7.6×105 cells/mL) were placed in a 96-well black microplate and incubated for a period of 36 h under 5% CO2 at 37° C. After this, the growth medium was removed using needles, washed using 1× PBS (100 μL), and exposed for 1 h to 100 μL of DMEM (60 UM Dichloro-dihydro-fluorescein diacetate DCFH-DA). CSPH was then added to a final concentration of 5 mg/mL. The solution was removed from each well, followed by a final washed-out with 1× PBS. The cells were exposed to an oxidizing environment by pipetting 100 μL of 500 μM AAPH into each well. Emission by the samples was measured for every 5 min for 1 h using a fluoresce reader Spectra Max Gemini EM spectrofluorometer (Molecular Devices, Sunnyvale, CA) with an excitation wavelength of 485 nm and an emission wavelength of 538 nm. A sample blank, positive and negative control were required to calculate the cellular antioxidant activity. Sample blanks contained DMEM and (DCFH-DA) without AAPH, negative control wells were prepared incubating cells with DCFH-DA and AAPH and the positive control wells were incubated with cells treated with l-ascorbic acid (50 μM), DCFH-DA and AAPH. Finally, the cellular antioxidant activity was measured with equation [Eq. (7)], were the blank was subtracted from the sample readings. The fluorescence emission against time data were plotted and used to, calculate the area under the curve in CAA values (%) (Wolfe & Liu, 2007)

$$CAA \text{ unit} = 100 - \left(\frac{\int SA}{\int CA}\right) \times 100, \tag{7}$$

wherein $\int SA$ refers to the integral of the sample fluorescence vs. time and $\int CA$ refers to the integral from the control sample.

Dipeptidyl Peptidase IV (DPP-IV) Inhibitory Activity

The DPP-IV inhibitory activity of CSPH was determined following the method by Hall et al. (2018). CSPH samples were dissolved in 100 mM Tris-HCl buffer (pH 8.0) to a final concentration of 1.25 mg/mL. Sample aliquots (25 µL) were pipetted and pre-incubated in a 96-well microplate with 25 µL of substrate Gly-Pro p-nitroanilide hydrochloride (6 mM) at 37° C. for 10 min. The colorimetric reaction was initiated by adding 50 µL of human DPP-IV (4.5 unit/mL), followed by incubation at 37° C. for 60 min. The reaction was stopped by adding 100 µL of 1 M sodium acetate buffer (pH 4.0). Absorbance of released p-nitroanilide was measured at 405 nm using a Multiskan™ FC Microplate Photometer (Waltham, MA, USA). Sample absorbance was corrected by subtracting blanks in which DPP-IV was replaced with Tris-HCl buffer (100 mM, pH 8.0). The positive control (no inhibitor) used the buffer instead of CSPH sample. For negative control (no DPPIV activity), the buffer was used instead of DPP-IV solution. Percent DPP-IV inhibition was calculated using equation [Eq. (8)].

$$DPP\ IV\ \text{inhibition}\ \% = \qquad (8)$$
$$1 - \left[ \frac{\text{Abs Sample-Abs Sample blank}}{\text{Abs positive control-Abs negative control}} \right]$$

Angiotensin Converting Enzyme (ACE) Inhibitory Activity

ACE-inhibitory activity was measured according to Hall et al. (2018). CSPH and control samples were dissolved in sodium phosphate buffer (100 mM, pH 8.3) with NaCl (300 mM). Aliquots (25 µL) of CSPH solutions were added to 25 µL of the substrate hippuryl-L-histidyl-1-leucine (HHL) and incubated at 37° C. for 4 min. Then, aliquots (80 µl) of human-ACE (50 mU) were added to initiate the reaction, followed by incubation at 37° C. in a water bath with constant stirring for 2 h. Reaction was terminated by adding 50 µl of 1 M HCl; then the solution was filtered using a 0.22 µm nylon filter. A control reaction was performed using 25 µl of buffer instead of the inhibitor (CSPH). Hippuric acid (HA) was quantified using high-pressure liquid chromatography (HPLC) (Model 600E, Waters Corporation, Milford MA) with a C18 analytical column (YMC Pack ODS AM 12505-2546WT, YMC America, Inc., Allentown, PA, USA). Percentage inhibition was calculated using equation [Eq. (9)]

$$ACE\ \text{Inhibition}\ \% = \left[ 1 - \frac{A_{inhibitor}}{A_{control}} \right] \times 100, \qquad (9)$$

wherein, Ainhibitor and Acontrol represent the relative areas (A) with and without inhibitor of the HA peaks. The half maximal inhibitory concentration (IC50) determined the potency of the samples towards ACE inhibitory activity. IC50 was expressed in mg of protein per mL. IC50 calculations were determined at four different CSPH concentrations (0.05, 0.5, 1, and 5 mg/mL) in triplicate.

Functional Properties of CSPH

Solubility. Protein solubility was measured following the method described by Chobert, Bertrand-Harb, and Nicolas (1988) and modified by Hall, Jones, O'Haire, and Liceaga (2017). CSPH were diluted to 1 mg/mL in 15 mL buffers with pH 3.0 (0.1 M sodium Acetate), 5.0 (0.1 M sodium Acetate), 7.0 (7.4 mM Phosphate) and 9.0 (0.1 M Glycine-sodium hydroxide), respectively. The solutions were stirred for 30 min at room temperature, followed by centrifugation at 12,150×g (25° C.) for 5 min. The protein content in the supernatant was determined using the bicinchoninic acid (BCA) protein assay method with bovine serum albumin as standard. Protein solubility was calculated by the ratio of protein in the supernatant to the protein content in the sample [Eq. (10)].

$$\text{Solubility}\ \% = \frac{\text{Protein content in supernatant}}{\text{Total protein content in sample}} \times 100 \qquad (10)$$

Emulsion and Foaming Capacity

Emulsifying activity index (EAI) and Emulsion stability index (ESI) were measured spectro turbidimetrically following the procedure of Pearce and Kinsella (1978) and some modifications by Liceaga-Gesualdo and Li-Chan (1999). Foaming capacity (FC) and foam stability (FS) were determined using the method proposed by Waniska and Klinsella (1979) with modifications of Pacheco-Aguilar, Mazorra-Manzano, and Ramírez-Suárez (2008).

Preparation of Chia Seed Protein Hydrolysates and their Peptide Fractions

Hydrolysates from chia seed protein were obtained according to Urbizo-Reyes et al. (2019). First, chia seed mucilage was extracted using a combined approach consisting of an ultrasound treatment and vacuum-assisted filtration. Subsequently, defatted chia seed meal was hydrolyzed using sequential enzymatic (alcalase followed by fla-vourzyme, AF) microwave-assisted hydrolysis (MW). Subsequently, the hydrolysate was fractionated by ultrafiltration using a <3 kDa cutoff membrane. Protein concentration was determined by the bicinchoninic acid (BCA) protein assay kit according to the manufacturer's instructions (Pierce Biotechnology Inc., Rockford, IL, USA), using bovine serum albumin as standard. The protein concentration of each sample was adjusted to 1 mg/mL using Tris-HCl buffer (100 mM, pH 8) for elastase, phosphate-buffered saline solution (PBS, 0.5 mM, pH 7.2) for tyrosinase, tricine buffer (50 mM, pH 7.5) for collagenase, and acetate buffer (50 mM, pH 4.5) for the hyaluronidase inhibition assays. Additionally, for the size exclusion chromatography analysis, the sample was dissolved using sodium phosphate (3.3 mM of $Na_2HPO_4 \cdot 7H_2O$, 1.7 mM of $NaH_2PO_4 \cdot H_2O$) with 0.14 M sodium chloride at pH 7. All samples were immediately stored in the dark at 4° C. until used.

Evaluation of In Vitro Anti-Aging Bioactive Properties Elastase Inhibition Assay of <3 kDa Fraction The elastase inhibition was evaluated according to Azmi et al. (2014) with some modifications. Briefly, 100 µL of either test sample or buffer (control) were combined with 50 µL of substrate 10 mM/of N-(methoxysuccinyl)-Ala-Ala-Pro-Val p-nitroanilide (10 mM), and incubated for 15 min at 37° C. The solutions were mixed with 50 µL of pre-incubated (5 min, 37° C.) elastase (50 mU), and the reaction was carried out for 15 min. Finally, the absorbance of the reaction was recorded at 405 nm. The percentage of inhibition was calculated with equation [11], where $OD_{control}$ and $OD_{sample}$ represent the optical density of the control and samples, respectively.

$$(\%)\ \text{Inhibition} = \frac{OD_{control} - OD_{sample}}{OD_{control}} \times 100 \qquad [11]$$

Tyrosinase Inhibition Assay

Tyrosinase inhibition was evaluated according to Hong et al. (2019) with some modifications. Briefly, 100 μL of either test samples or buffer (control) were combined with 50 μL of substrate 3,4-dihydroxy-L-phenylalanine (10 mM), and incubated for 15 min at 30° C. The solutions were mixed with 50 μL of pre-incubated (5 min, 30° C.) tyrosinase (150 U), and the reaction was carried out for 15 min. Finally, the absorbance of the reaction was recorded at 450 nm. The percentage of inhibition was determined using equation [11].

Collagenase Inhibition Assay

Collagenase inhibition was evaluated according to the method by Hong et al. (2019) with some modifications. Briefly, 100 μL of either test samples or buffer (control) were combined with 50 μL of substrate N-[3-(2-furyl) acryloyl]-Leu-Gly-Pro-Ala (1 mM), and incubated for 15 min at 30° C. The solutions were mixed with 50 μL of pre-incubated (5 min, 30° C.) collagenase (100 mU), and the reaction was carried out for 15 min. Finally, the absorbance of the reaction was recorded at 340 nm. The percentage of inhibition was calculated using equation [11].

Hyaluronidase Inhibition Assay

The hyaluronidase inhibition was evaluated according to Facino et al. (1995) with some modifications. Briefly, 100 μL of either test samples or buffer (control) were combined with 50 μL of substrate hyaluronic acid sodium salt, and incubated for 15 min at 37° C. The solutions were mixed with 50 μL of pre-incubated (5 min, 37° C.) hyaluronidase (1 mg/mL), and the reaction was carried out for 15 min. Absorbance was recorded at 550 nm. The percentage of inhibition was calculated using equation [11].

For all the inhibitory activity assays, in addition to the percent of enzyme inhibition (at 1 mg/mL), the peptide concentration (mg/mL) required for 50% enzyme inhibition (IC50) was calculated using three different peptide concentrations (1, 1.5, and 2 mg/mL).

Mode of Enzyme Inhibition

The type of enzyme inhibition was determined according to Lineweaver-Burk graphs of reciprocal product concentration absorbance versus the reciprocal of substrate concentrations as described by Hall and Liceaga (2020) with Km and Vmax were determined according to the Lineweaver-Burk plots. Various substrate concentrations (0.5, 0.25, and 0.125 mM) were incubated in the presence/absence of inhibitor concentrations (0, 1, 1.5, and 2 mg/mL). Enzyme inhibition (%) were measured as described above. Reaction velocities (ΔAbs/min) were determined from the formation of product over time.

Identification and Characterization of Peptides in the Most Active <3 kDa Peptide Fraction The molecular weight distribution of the <3 kDa peptide fraction was first determined using size exclusion chromatography (SEC) in a Waters 2695 HPLC system equipped with a UV detection of 254 nm on a column Superdex peptide 10/300 GL (GE Healthcare, 17-5176-01, column 30 cm×10 mm, 13 μm). Injection volume was 100 μL, and SEC eluent was sodium phosphate (3.3 mM of $Na_2HPO4 \cdot 7H2O$, 1.7 mM of $NaH2PO4 \cdot H2O$, with 0.14 M sodium chloride at pH 7) at flow rate of 1 mL/min. Signal was monitored at 254 nm, and fractions were pooled and lyophilized immediately. Fractions (F-I, II, III, IV and V) were collected at different retention times and the spectra normalized by their maximum peak height. Finally, before further analyses the samples were desalted using C18 desalting tips (Thermo Scientific™ Pierce™) following manufacturer instructions. All the fractions collected were assayed for aging-related enzyme inhibitory activities according to the methods described above. The SEC fraction with the highest inhibiting aging-related enzymes was further selected for peptide sequence identification by LC-MS/MS technique in the Proteomics Core facility at the Indiana University School of Medicine (Indianapolis, Indiana, USA).

In Silico Analysis of F-II Peptides with Elastase

For this analysis, the peptides identified in the previous step and the enzyme elastase were used. The molecular protein-peptide interaction was performed using the CABS-dock web server (http://www.biocomp.chem.uw.edu.pl/CABSdock/) since it provides an interface for modeling protein-peptide interactions using a highly efficient protocol for the flexible docking of peptides to proteins (Kurcinski et al. 2015). Because the CABS-dock web server allows a maximum protein size of 500 amino acids for docking analysis, we selected elastase that has 240 amino acids, as the target enzyme. In addition, the chia seed peptides showed the greatest inhibition towards this enzyme. The 3D crystal structure of elastase from porcine pancreas was downloaded from the Research Collaboratory for Structural Bioinformatics Protein Data Bank (RCSB PDB, https://www.rcsb.org/) with the PDB ID: 1LVY. The analysis was performed with 50 cycles of Monte Carlo simulation. Of the final models (a set of 10 representative models), we select the top-ranked model 1 because is the most probable docking trajectory and the best accuracy predicted model for elastase-peptide interaction. A Complementary analysis of the resulting structures were done with the web-based 3D structure viewer "iCn3D" (www.ncbi.nlm.nih.gov) in order to observe the hydrogen bonding between elastase and the peptide tested.

Statistical Analysis

Results were reported as mean±standard deviation (SD) of triplicate determinations. A complete randomized design was used as a statistical model with a Duncan separation of means $p < 0.05$. The correlation analysis between antioxidant assays and cellular antioxidant activity was calculated using a $p < 0.05$. The statistical analysis was carried out using the statistical software SAS 9.4 (Cary, NC, USA). The statistical analysis of experimental data was made using ANOVA followed by Tukey's test. Differences were considered to be significant when $P < 0.05$. All analyses were performed using the NCSS software version 2007 (NCSS Statistical software, Kaysville, UT, USA). Each experiment was repeated three times, and all tests were run in triplicate for each experiment.

Results and Discussion

Mucilage Ultrasound Separation

In preliminary trials ultrasound treatment and vacuum-assisted filtration increased mucilage separation the most, while other tested methods involving other physical separation methods (centrifugation and mesh filtration) showed inefficient separation of mucilage (FIGS. 1B and 1C). The mucilage ultrasound-extraction method was optimized using a wave amplitude of 90 μm and 60° C. temperature, followed by separation using vacuum-assisted filtration. The mucilage extraction yield was higher ($p < 0.05$) when ultrasound was used (7.65±0.19%), compared to freeze-drying the CS (4.21±0.29%), and oven drying CS (3.65±0.18%). The yield values obtained for conventional extractions methods in this study lower than the ones reported by Campos et al. (2016) and Capitani et al. (2013). Chemat et al. (2017) showed how ultrasound developed high shear stresses in the proximity between liquid and solid materials, causing oil to separate from basil leaves, addressing the possibility of this application in other food matrices such as chia seed mucilage.

Ultrasound frequencies generated microjets in the chia seed surface, targeting structures called collumnellas that allowed for the physical separation of mucilage in a fast and efficient way. Mucilage extraction can assist in its application as a biomaterial that can provide stability to emulsions among other uses (Avila-De La Rosa, Alvarez-Ramirez, Vernon-Carter, Carrillo-Navas, & Pérez-Alonso, 2015). We can conclude that the combination of ultrasound treatment followed by vacuum filtration increased the extraction yield of mucilage from chia seeds.

Chia Seed Oil Extraction

The oil extraction yield obtained by cold press was 28.24±0.06 g of oil/100 g of chia seeds (without mucilage). The oil content in chia seeds varies between 30 and 33% (Sandoval-Oliveros & Paredes-López, 2013). This pressing technology allows to remove about 86-94% of the total fat of the seed. The use of screw-press for oil extraction is a good alternative to reduce the use of hazardous solvents such as isopropanol and hexane in the extraction. Also, removal of oil from seeds (in preliminary experiments) showed to increase the enzyme-protein interaction, facilitating the hydrolysis.

TABLE 2-continued

Correlation analysis between antioxidant assays and cellular antioxidant analysis.

| Antioxidant assays | Pearson Correlation Coefficients for CAA (r) | Probability |
|---|---|---|
| DPPH | 0.88887 | 0.043* |
| ORAC | 0.64662 | 0.023* |

*significant correlation (p < 0.05) was established.

TABLE 3

Total Amino acid content (g/100 g) for chia seed protein and CSPH.

| Amino Acid | Control | A-WB | A-MW | AF-WB | AF-MW |
|---|---|---|---|---|---|
| Gly | 5.128 | 4.278 | 4.465 | 4.231 | 4.354 |
| Ala | 5.405 | 5.196 | 4.994 | 4.972 | 4.940 |
| Pro | 3.573 | 3.518 | 3.533 | 3.477 | 3.708 |

TABLE 1

Hydrolysis conditions, degree of hydrolysis and bioactive properties of CSPH*

| code | Hydrolysis time, (% Enzyme) | Degree of hydrolysis (%) | % MIC Inhibition | DPPH (μmol TE/mg) | ABTS (μmol TE/mg) | ORAC (μmol TE/mg) |
|---|---|---|---|---|---|---|
| A-WB | 1 h 3% | 33.64 ± 1.44c | 66.93 ± 0.57c | 131.74 ± 17.33b | 465.97 ± 10.46c | 1225.49 ± 55.53bc |
| A-MW | 1 h 3% | 37.04 ± 2.67bc | 72.76 ± 0.42b | 166.61 ± 15.34a | 435.30 ± 12.96d | 1535.81 ± 99.16a |
| AF-WB | 3 h 2% | 46.81 ± 0.19a | 74.11 ± 0.64b | 171.31 ± 8.27a | 489.09 ± 3.86b | 1482.48 ± 114.63 ab |
| AF-MW | 1.5 h 2% | 40.68 ± 0.77 ab | 76.85 ± 0.37a | 178.02 ± 15.86a | 506.07 ± 4.50a | 1122.71 ± 24.74c |
| Control | 0 0% | 0.00 ± 0.00d | 54.43 ± 1.03d | 22.99 ± 1.49c | 100.57 ± 3.80e | 816.33 ± 86.18d |

| code | Cellular antioxidant activity % per mg of protein | DPPIV inhibition capacity % inhibition per 2.5 mg of protein | IC$_{50}$ (mg/mL) | ACE inhibition capacity % inhibition per mg of protein | IC$_{50}$ (mg/mL) |
|---|---|---|---|---|---|
| A-WB | 87.54 ± 3.31bc | 37.05 ± 0.99c | 4.38 ± 0.49a | 57.16 ± 1.93a | 0.51 ± 0.12a |
| A-MW | 93.13 ± 1.07 ab | 40.56 ± 0.42c | 3.59 ± 0.31b | 57.17 ± 3.42a | 0.44 ± 0.09a |
| AF-WB | 80.06 ± 2.48c | 69.50 ± 1.05a | 1.28 ± 0.09d | 56.24 ± 0.74a | 0.42 ± 0.04a |
| AF-MW | 94.76 ± 1.96a | 53.49 ± 0.86b | 2.12 ± 0.08c | 45.60 ± 2.24b | 0.55 ± 0.02a |
| Control | 62.00 ± 9.08d | 18.18 ± 1.47d | — | 11.18 ± 2.31c | — |

*Values are mean ± standard deviation of triplicate determinations. Different letters (a-d) indicate significant differences (p < 0.05) between treatments (rows). A-WB: chia seed protein hydrolyzed by alcalase enzyme using water bath heating method. A-MW: chia seed protein hydrolyzed by alcalase enzyme using microwave-assisted hydrolysis. AF-WB: chia seed protein hydrolyzed sequentially by alcalase and flavourzyme enzymes using water bath heating method. AF-MW: chia seed protein hydrolyzed sequentially by alcalase and flavourzyme enzymes using microwave-assisted hydrolysis. Control: unhydrolyzed chia seed protein, also known as chia seed flour.

TABLE 2

Correlation analysis between antioxidant assays and cellular antioxidant analysis.

| Antioxidant assays | Pearson Correlation Coefficients for CAA (r) | Probability |
|---|---|---|
| MIC | 0.8626 | 0.059 |
| ABTS | 0.88192 | 0.047* |

TABLE 3-continued

Total Amino acid content (g/100 g) for chia seed protein and CSPH.

| Amino Acid | Control | A-WB | A-MW | AF-WB | AF-MW |
|---|---|---|---|---|---|
| Val | 4.358 | 4.462 | 4.272 | 4.563 | 5.021 |
| Ile | 2.544 | 3.096 | 3.003 | 3.114 | 3.474 |
| Leu | 5.328 | 5.685 | 5.550 | 5.532 | 5.985 |
| Met | 4.629 | 3.604 | 3.986 | 3.970 | 3.759 |
| Phe | 3.267 | 3.219 | 3.408 | 3.397 | 3.850 |

TABLE 3-continued

| Amino Acid | Control | A-WB | A-MW | AF-WB | AF-MW |
|---|---|---|---|---|---|
| His | 1.417 | 1.358 | 1.362 | 1.332 | 1.358 |
| Thr | 3.964 | 3.608 | 3.502 | 3.520 | 3.567 |
| Cys-Cys | 3.046 | 1.536 | 1.843 | 1.797 | 1.804 |
| Tyr | 0.069 | 0.013 | 0.017 | 0.009 | 0.007 |
| Glu | 29.001 | 30.857 | 30.675 | 30.552 | 29.181 |
| Arg | 7.309 | 7.484 | 7.985 | 8.125 | 8.316 |
| Ser | 4.913 | 5.447 | 5.545 | 5.556 | 5.551 |
| Asp | 10.064 | 12.158 | 11.710 | 11.418 | 10.808 |
| Lys | 5.984 | 4.479 | 4.151 | 4.436 | 4.317 |
| SCAA* | 7.675 | 5.140 | 5.829 | 5.767 | 5.564 |
| AAA | 4.754 | 4.591 | 4.788 | 4.738 | 5.215 |
| PCAA | 14.710 | 13.322 | 13.498 | 13.893 | 13.991 |
| BCAA | 12.230 | 13.243 | 12.825 | 13.208 | 14.480 |

*SCAA = sulfur containing amino acids (Met + Cys). AAA = Aromatic amino acids. (Phe, His and Tyr). PCAA = positively charged aminoacids (Arg, His and Lys). BCAA = Branched containing amino acids (Leu, Ile and Val). Sample codes descriptions are provided in Table 1.

Enzymatic Hydrolysis

Table 1 shows the degree of hydrolysis obtained from the different treatments. The highest degree of hydrolysis (46.81±0.19 and 40.68±0.77%) was obtained by sequential hydrolysis with alcalase and flavourzyme (AF-WB) and (AF-MW), respectively. CS protein is difficult to hydrolyze due to its high content of globulin fractions, which contain several sulfur amino acids directly involved in maintaining the tertiary and quaternary structure of the protein (Sandoval-Oliveros & Paredes-López, 2013). This conformation limits the access of the enzyme to cleavage sites that are located within the protein fraction. This was confirmed by the amino acid analysis were the content of sulfur-containing amino acids (Cys+Met) (Table 3) make up to 7% of the total amino acid composition of chia seed flour (control); a similar value of 6% was reported by Sandoval-Oliveros and Paredes-López (2013). The higher hydrolysis in the AF-MW treatment can be attributed to the efficient separation of mucilage and the use of microwave energy.

Singh, Orsat, and Raghavan (2013) evaluated the effect of electromagnetic fields in protein structure and conformational changes, showing how magnetic forces pull dielectric charges in the protein backbone causing protein unfolding or re-orientation (Singh et al., 2013). The protein unfolding exposes active sites that allow the proteases to carry out digestion in a fast and efficient way. In addition, separation of mucilage played an important role in the effectiveness of the hydrolysis. The minimum presence of this polysaccharide can block the enzyme-substrate interaction by a process called enzyme immobilization, resulting in low proteolysis. A study conducted by Monroy-Torres, Mancilla-Escobar, Gallaga-Solórzano, and Santiago-García (2008) showed that CS flour has a low protein digestibility (79.28%) which is attributed to the presence of mucilage. In general, the utilization of an efficient mucilage separation method and microwave energy decreased the time required to generate higher hydrolysis (DH) and consequently produce lower molecular weight peptides.

Antioxidant Activity

Figure 3:
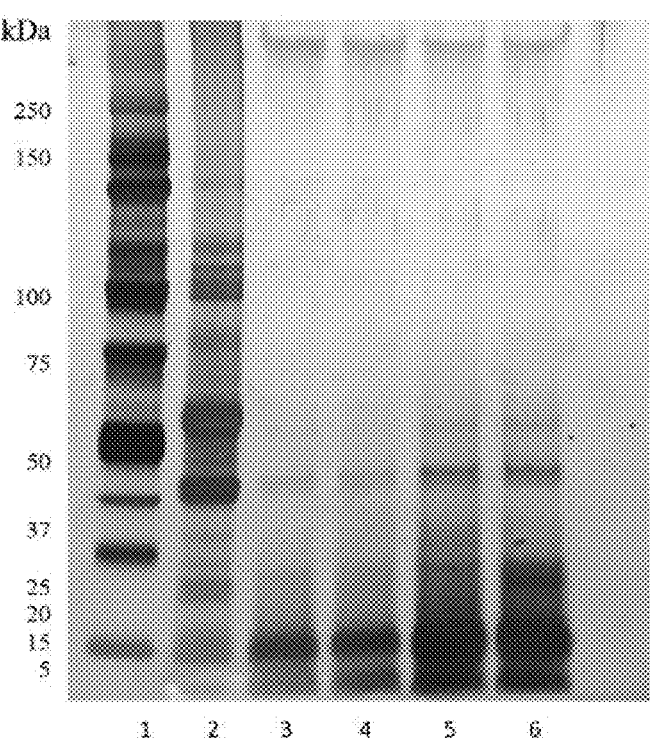

The antioxidant properties of the peptides are shown in (Table 1). Overall, the trend for radical scavenging activity of the peptides showed an increase with increasing extent of hydrolysis (DH). AF-MW protein hydrolysates showed overall significant higher (p<0.05) antioxidant properties for MIC, DPPH, ABTS, and CAA. Orona-Tamayo, Valverde, Nieto-Rendón, and Paredes-López (2015) identified that CS protein between 20 and 33 kDa corresponds to the globulin protein fraction. Globulin fractions, specifically Globulin 11s, are responsible for the high antioxidant activities in plant-based materials (Delgado et al., 2016). In this study, the same band was observed in the molecular weight distribution corresponding to AF-MW (FIG. 3); it is suspected that the combination of sequential hydrolysis and microwave energy caused a partial extraction of globulin fractions. Also, the presence of small peptides in all CSPH treatments displayed strong molecular weight bands below 25 kDa (FIG. 3), the presence of low molecular weight peptides can be responsible for the high antioxidant activity of CSPH treatments when compare to the unhydrolyzed chia seed protein (control).

For ABTS, the results for AF-MW are 70-fold higher than those previously reported by Segura-Campos, Salazar-Vega, Chel-Guerrero, and Betancur-Ancona (2013), where the protein hydrolysates were produced using sequential hydrolysis and water bath. ABTS and DPPH assays evaluated antioxidant activity by a specific mechanism called scavenging of free radicals. Studies have shown that ability is enhanced depending on factors such as amino acid composition, protein sequences and structural properties (Sarmadi & Ismail, 2010). AF-MW treatment allowed for the release of a specific group of globulin fractions (G3, G4 and G5), which compared to unhydrolyzed CS protein, showed that the globulin fraction has a higher concentration of Phe, Tyr and His (Sandoval-Oliveros & Paredes-López, 2013). These results lined up with the ones obtained in this study, were the content of aromatic amino acids (His and Phe) are higher in AF-MW compared to unhydrolyzed CS protein (Table 3). It is hypothesized that protein rotation and unfolding caused by MW and the release of encrypted peptides cause by sequential hydrolysis, enhanced the exposure of these aromatic amino acids responsible of a high donation of protons (Sarmadi & Ismail, 2010). The proton donations from aromatic amino acids to molecules with electron deficiency, improves the scavenging activity stabilizing reactive molecules (Sarmadi & Ismail, 2010). In contrast, the metal ion chelating (MIC) capacity is generally attributed to peptides containing sulfhydryl amino acids such as Cys and Met, which can bind heavy metals and reduce the pro-oxidant activity of some metals. The content of Cys and Met amino acids (Table 3) was higher in the control than in other treatments. It is hypothesized that microwave-assisted hydrolysis released encrypted sulfur peptides, making them more bioavailable to interact with free metals, therefore enhancing the MIC capacity.

ORAC is a common antioxidant assay based on the quantification of the fluoresce emitted by a probe, in this case a protein called fluorescein. Fluorescein is exposed to an oxidative environment by AAPH that causes degradation of the protein, and, consequently, a loss in fluorescence. This assay measures the hydrophilic antioxidant capacity against certain peroxyl radicals (Aruoma, 2003). The highest ORAC values (p<0.05) were seen in the microwave treatments A-MW and AF-WB at, 1535.81±99.16 and 1482.48±114.63 µmol TE/mg of protein, respectively. Exposure during hydrolysis of encrypted nonpolar residues such as Gly, Ala, Ile, Trp, Tyr and Met is speculated, this in turn can cause an increase in hydrophobic interactions of peptides with oxidizing agents. These results showed a higher ORAC value compared to other digested materials such as cowpea protein (783.8 µmol/g of protein) and salmon (1541 µmol/g of protein) (Marques et al., 2015).

The cellular antioxidant activity (CAA) assay indirectly evaluates the permeability of a compound through the cell bilayer while estimating the antioxidant capacity. In this method, a fluorescent probe DCFH-DA is introduced into the Caco-2 cells, and by the action of esterase is turned into a more polar form of DCFH which emits fluorescence under physiological conditions (Wan et al., 2015). In order to protect DCFH from oxidation caused by AAPH solution, the CSPH peptides must permeate and/or bind to the cell membrane and function a protective barrier against free radicals, thus preventing molecular damage of intracellular organelles and proteins. If the peptides have a good permeability and a high enough antioxidant capacity, they will protect the fluorescent probe from turning into dichloro-dihydro-fluorescein (DCF) and consequently avoiding a decrease in light emission through time (Wan et al., 2015). The highest CAA value was observed for the microwave treatments AF-MW and A-MW (94.76±1.96 and 93.13±1.07%, respectively). Wolfe and Liu (2007) found that the hydrophobicity of the compounds was an important criterion to determine the antioxidant effectiveness in cell culture. This is not the only criteria since structural conformation also plays a crucial role in the quality and effectiveness of the antioxidant activity of these compounds (Wolfe & Liu, 2007). Conradi, Hilgers, Ho, and Burton (1991) found that the permeability of peptide chains was significantly correlated with the total number of hydrogen bonds a peptide can possibly form with water since the major impediment for passive absorption is the energy required to break the peptide-water hydrogen bonds. It is hypothesized that smaller peptides that have a weaker hydrogen bonding capacity and a higher concentration of antioxidant amino acids on the microwave samples (A-MW and AF-MW), are responsible for the increased cellular antioxidant activity observed in this study.

Correlation of Antioxidant Assays to CAA

A correlation analysis was carried out determining the significance of some antioxidant assays to predict cellular antioxidant activity. The analysis presented a significant correlation ($p < 0.05$, $r = 0.888$) of DPPH with respect to CAA followed by ABTS (Table 2). No significant correlation was found for MIC and CAA. The correlation values between antioxidant assays and CAA was not found in literature for most of the conventional antioxidant methods. Wolfe et al. (2008) established a correlation of ORAC to CAA finding that this assay positively correlates with a Pearson correlation coefficient of ($r = 0.803$) and a significance ($p < 0.05$). Their results differ with the results obtained in this study, were ORAC values showed lower correlation ($r = 0.646$, $p < 0.05$). We can conclude that DPPH and ABTS are the most useful screening methods for antioxidant evaluation of compounds since the chemical conditions of these assays allow the effective prediction of in vitro antioxidant activity in cellular environments.

Antidiabetic Properties

The antidiabetic capacity assay measures the peptides' ability to inhibit human DPP-IV. The DPP-IV activity improved in all hydrolyzed treatments compared to the control (Table 1). The highest ($p < 0.05$) DPP-IV inhibition was observed in AF-WB (69.50±1.05%) and the lowest was in the control (18.18±1.47%). Matsui, Oki, and Osajima (1999) studied the DPP-IV inhibition activity of sardine muscle hydrolysates and attributed the inhibition capacity to di- and tetra-peptides that match the structure of the substrate of the DPP-IV enzyme. In another study, Nongonierma, Le Maux, Dubrulle, Barre, and FitzGerald (2015) evaluated the DPP-IV inhibitory activity of the protein hydrolysates of quinoa, a similar pseudo-cereal. The IC50 value of quinoa protein hydrolysates was of 0.88±0.05 mg/mL using a porcine DPP-IV enzyme (0.0025 U/mL). Velarde-Salcedo et al. (2013) evaluated the DPP-IV inhibition of amaranth tryptic digests using porcine DPP-IV (0.0025 U/mL) and found IC50 value ranging between 1.2 and 2 mg/mL. To the best of authors' knowledge, no previous report of DPP-IV inhibition activity by CSPH using human DPP-IV (2.25 U/mL) has been reported. In this study AF-WB CSPH had an IC50 of 1.28 mg/mL, showing the bioactive potential for CSPH, compared to other pseudo-cereals. Lacroix and Li-Chan (2015) compared the susceptibility of porcine and human DPP-IV to inhibition and found that porcine DPP-IV is generally inhibited with greater efficacy by protein derived peptides than human DPP-IV. Generally, the DPP-IV inhibition is enhanced with the presence of lower molecular peptides, probably matching the structure of the incretin hormones (GIP and GLP-1). The incorporation of flavourzyme might have influenced the development of tetra- and di-peptides that match the DPP-IV active site. A similar result was obtained for protein hydrolysates derived from Atlantic salmon (salmon salar) skin gelatin, were the highest DPP-IV inhibition was achieved using flavourzyme (Li-Chan, Hunag, Jao, Ho, & Hsu, 2012).

Anti-Hypertensive Activity

In this study, most of the CSPH treatments had similar ACE inhibition capacity except for AF-MW and the control which were significantly ($p < 0.05$) lower (Table 1). Other studies have looked at the bioactivity of CSPH incorporated into foods. A study conducted by Segura-Campos et al., 2013, showed an improvement in IC50 value of the ACE-inhibitory capacity of foods by incorporating 5.0 mg/g of CSPH into carrot cream, causing a decrease from 27.67 µg protein/mL to 1.71 µg protein/ml (Martínez-Hernández, Orona-Tamayo, Valverde-González, & Paredes-López, 2017). In our study, the IC50 values of CSPH was around 0.40 mg/mL. In the case of the lower inhibitory activity of AF-MW, it might be related to the formation of different structural peptides with a lower binding capacity to the ACE active site. Additional Analytical studies are needed to understand the difference with peptide conformation in CSPH. It is well known that the increase in DH and lower molecular-weight peptides improve the capacity of inhibiting ACE enzymes. Segura-Campos, Peralta-González, Chel-Guerrero, and Betancur-Ancona (2013) evaluated the ACE inhibitory capacity of CSPH (51.64% DH) and obtained 53.8-69.3% inhibition for purified fractions. In this study, the CSPH peptides displayed a 57% inhibition with a 46% DH. Nevertheless, an influence of microwave energy in peptide conformation is not clear for ACE inhibition. Ketnawa, Suwal, Huang, and Liceaga (2019) evaluated the ACE inhibition of microwave-assisted hydrolyzed peptides of rainbow trout (Oncorhynchus mykiss) and showed that peptides delivered from microwave-assisted hydrolysis had the highest inhibition at 93.5±0.24%.

Functional Properties

Figure 2A:
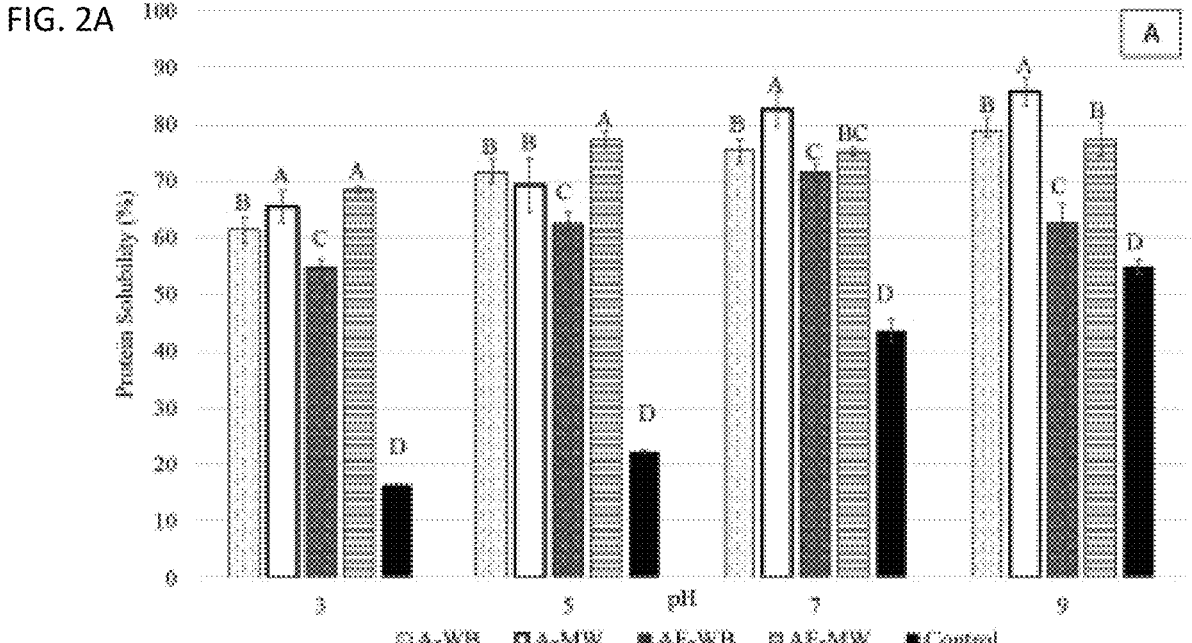

Solubility. The solubility of CSPH showed a dependency of the pH in all treatments, with solubility increasing with increasing pH (FIG. 2A). This pattern is similar to what is reported for many plant proteins, and is related to the low isoelectric point (pI) of CS protein. When the pH of the solution is above or below the pI of a protein the solubility is enhanced because the electrostatic repulsion between molecules is greater than the hydrophobic interactions (Zayas, 2012). CS protein extraction is more efficient at alkaline pH, reaching its maximum solubility at pH 12 (Timilsena, Adhikari, Barrow, & Adhikari, 2016). A previous study by Timilsena et al. (2016) evaluated the solubility of CS protein isolate, reporting 10% solubility at pH 3. A similarly low value was obtained in this study for the solubility of the control (16%) (FIG. 2A). AF-MW treatment showed the highest solubility at pH 3 (68.32%) and pH 5 (77.17%) when compared to other treatments (FIG. 2A). This can be attributed to the high degree of hydrolysis of this treatment (40.68%), where the presence of small peptides increases the exposure of polar and ionizable groups, consequently increasing their solubility (Nguyen et al., 2017). In addition, enzymatic hydrolysis by alcalase and flavourzyme can increase the number of smaller hydrophilic polypeptides (Zhao et al., 2012). At neutral and alkaline pH, A-MW treatment showed the highest solubility (p<0.05), suggesting that a medium DH (medium size peptides) could improve the solubilization of protein in neutral and alkaline solvents. The application of microwave-assisted hydrolysis can be correlated with an increase production of small peptides and consequently with an increased solubility (Uluko et al., 2013). Overall, hydrolyzing the CS flour improved the solubility of the protein hydrolysates, compared to the unhydrolyzed control at all pH range values.

Emulsion and Foaming Capacity

Figure 2B:
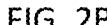
Figure 2B:
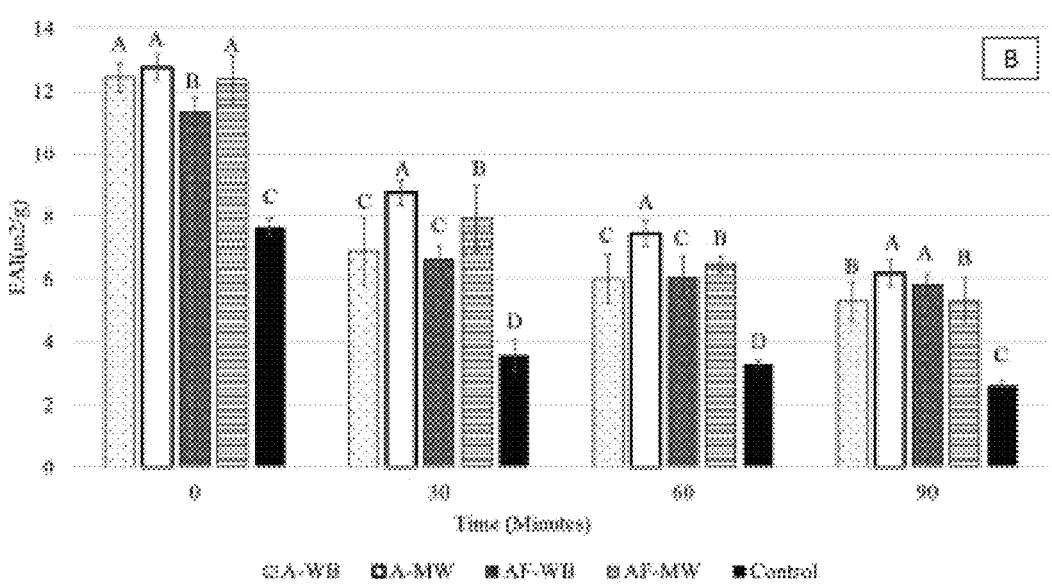

Hydrolysis of CS flour increased its emulsifying capacity (at 0 min) compared to the control (FIG. 2B). No difference (p<0.05) was found for the emulsifying capacities between A-WB, A-MW, and AF-MW. The overall improvement of these treatments in relationship with the control (unhydrolyzed protein) may be due to the enzymatic digestion by alcalase. Other researcher have reported similar observations. For example, Klost and Drusch (2019) hydrolyzed pea protein using enzymatic hydrolysis, and found that the oil-droplet-size in hydrolyzed proteins was smaller increasing the emulsion capacity of the unhydrolyzed protein, they attributed this to a vast exposure of hydrophobic residues and the presence of electrostatic repulsion between droplets. In addition, a possible effect of microwave irradiation is thought to be a result of protein denaturation. Villanueva, Harasym, Muñoz, and Ronda (2019) evaluated the effect of microwave energy in the viscoelastic characteristics of rice flour, where microwave treatments caused and overall increase in the network formation, which was attributed to the denaturation of the protein. Similarly, Zhang et al. (2019) evaluated the effect of heat treatments in camelia (C. oleifera) protein cake and found that protein denaturation caused a modification in the secondary structure of the protein. In contrast, AF-WB had lower emulsifying capacity (p<0.05) followed by the control. The decreased emulsifying capacity in this treatment could be correlated to its high degree of hydrolysis, meaning there is a higher content of low molecular weight peptides. In a study conducted using quinoa seed protein hydrolysates, results showed how smaller peptides are unable to form stable films around oil droplets, which result in the emulsion collapsing within time (Aluko & Monu, 2003). Differences (p<0.05) were observed when evaluating the emulsifying stability over 30, 60 and 90 min, where A-MW showed the best stability at 30 and 60 min, followed by the AF-MW (FIG. 2B). However, both alcalase treatments (A-MW and A-WB) had similar emulsion stability at 90 min. A study conducted by van der Ven, Gruppen, de Bont, and Voragen (2001) showed that whey and casein protein hydrolysates have better emulsifying capacities compared to intact casein and whey protein. Authors attributed this to a more uniform distribution of emulsion droplets size originated from partially hydrolyzed peptides compared to intact protein were the droplets are bigger and collapse faster (van der Ven et al., 2001).

Figure 2C:
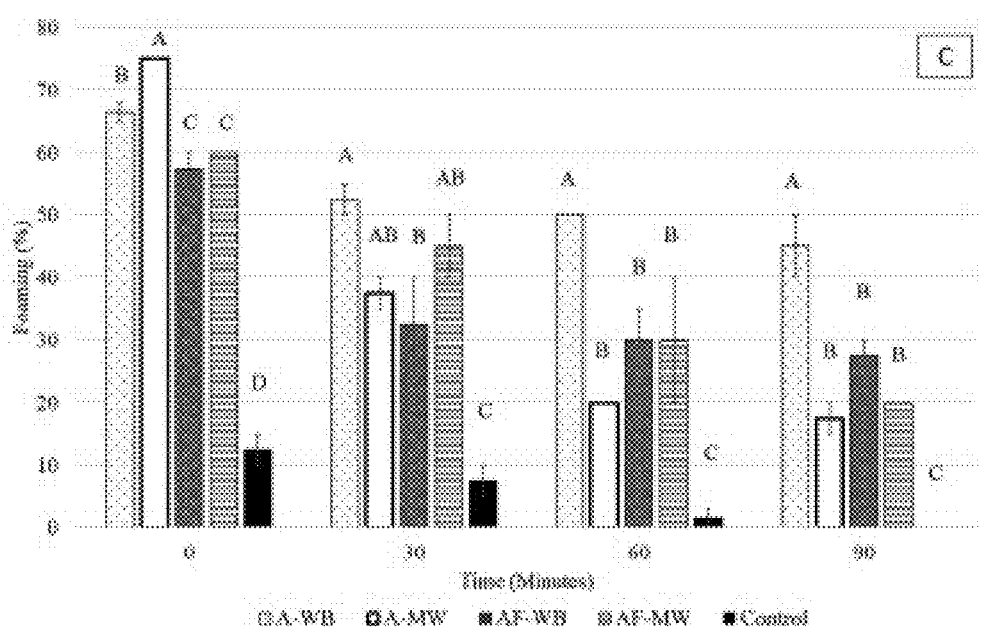

Foaming. A-MW showed the highest foaming capacity (75%) (at 0 min), followed by A-WB (66.5%) (FIG. 2C).

This result agrees with the highest solubility at pH 7 observed in A-MW, indicating that these peptides are more evenly distributed through the aqueous interface and consequently improve the way they entrap air molecules. Similarly, Nguyen et al. (2017) developed protein hydrolysates from rainbow trout frames using microwave-assisted hydrolysis, proving that lower molecular weight peptides derived by microwave energy diffuse faster into the air-water interface. CSPH showed a great potential in foaming capacity when compared to other protein sources such as whey protein hydrolysates and rice protein hydrolysates with 4 and 6% foaming capacity, respectively (Amagliani, O'Regan, Schmitt, Kelly, & O'Mahony, 2019). Olivos-Lugo, Valdivia-López, and Tecante (2010) evaluated the foaming capacity of CS protein isolate and reported 70% foaming capacity. The purification and isolation of the protein is suspected to be responsible of the high values reported for the CS protein isolate. Evaluation of foam stability at 30, 60 and 90 min, showed that A-WB resulted in overall higher foaming stability. The decrease in foaming capacity of A-MW compared to A-WB can be attributed to the presence of smaller peptides caused by microwave treatment; smaller peptides are known to have poor stability through time. Nevertheless, A-WB and A-WW have lower DHs amongst all CSPH (Table 1) meaning that medium size peptides might be present. Balti et al. (2010) evaluated the influence of DH on foaming properties of cuttlefish and found that foaming capacity decreased slightly as the protein hydrolysis increased. They attributed this to the loss of cohesiveness that is achieved with high molecular-weight peptides and partially hydrolyzed protein.

Anti-Aging Bioactive Properties

Figure 5:
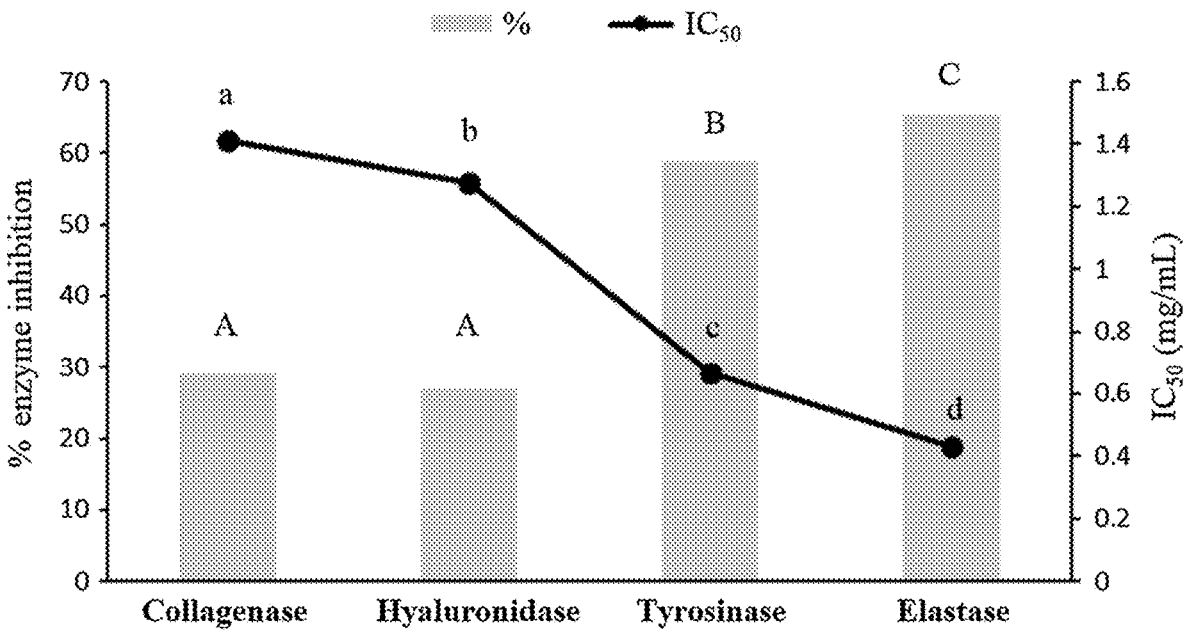
Figures 6A, 6B, 6C, 6D:
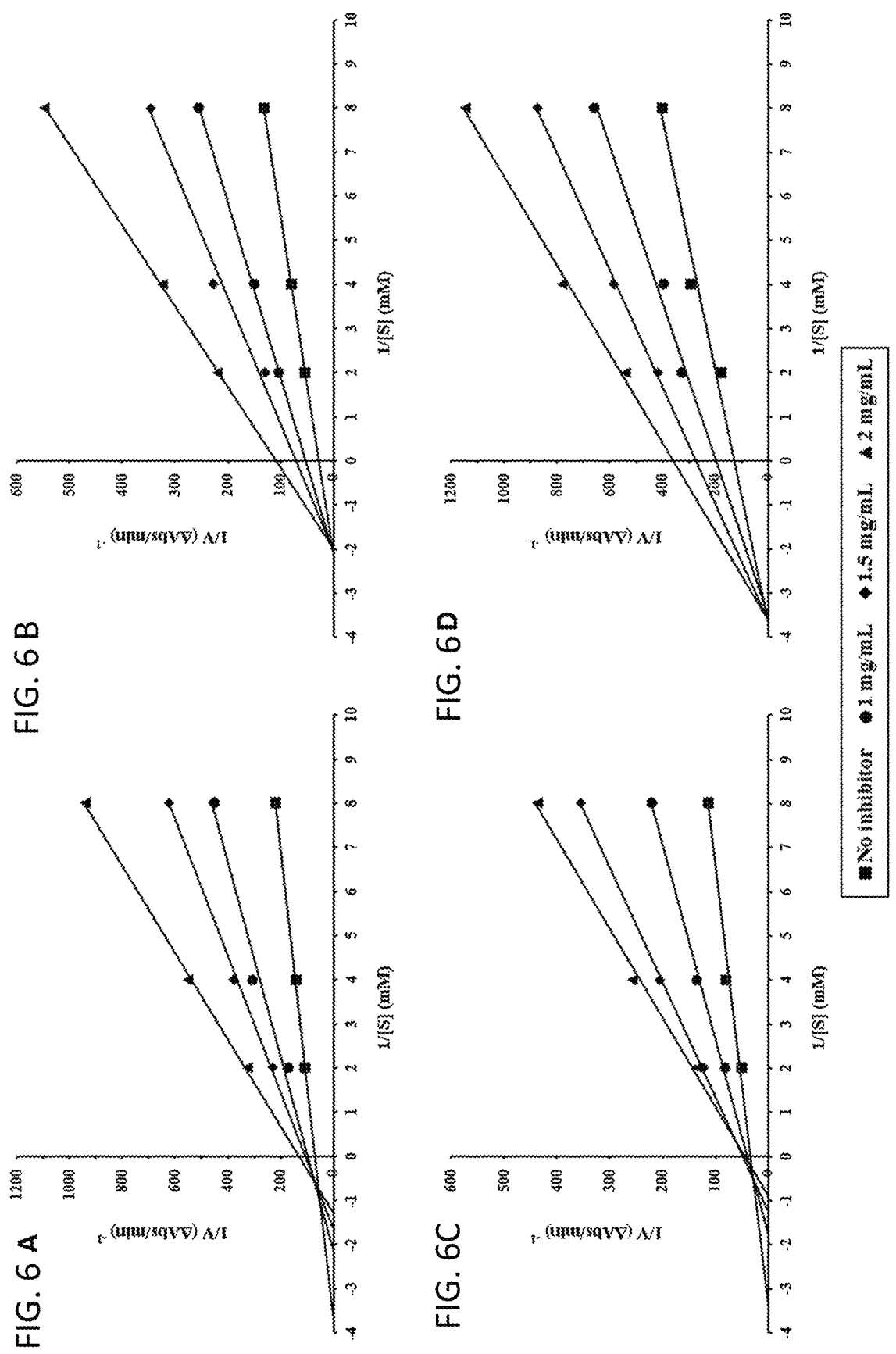

The inhibition properties of bioactive peptides towards the main enzymes associated with skin aging can indicate their potential role in the improvement of skin health. Our results (FIG. 5) showed that the <3 kDa peptide fraction (at 1 mg/mL) exhibited inhibitory activity towards all aging-related enzymes. Overall, this peptide fraction showed <50% of inhibition on collagenase and hyaluronidase enzymes, while it showed >50% of inhibition on tyrosinase and elastase enzymes. Accordingly, the IC50 values showed a similar trend, obtaining the best inhibitory value (P<0.05) on elastase (0.43 mg/mL), followed by tyrosinase (0.66 mg/mL), hyaluronidase (1.28 mg/mL), and collagenase (1.41 mg/mL).

Mode of Enzyme Inhibition

In order to investigate the inhibition pattern of chia peptides on the aging-related enzymes, each enzyme was assayed with different concentrations of substrate with and without inhibitor; such modes of inhibition are illustrated in Lineweaver-Burk plots (FIGS. 6A-6D). Chia seed peptides showed a mixed-type inhibition pattern towards elastase (FIG. 6A) and hyaluronidase (FIG. 6C) characterized by Km and Vmax changes at different concentrations. Chia peptides showed a non-competitive inhibition pattern towards collagenase (FIG. 6B) and tyrosinase (FIG. 6D), as seen by a decrease in Vmax and with constant Km.

Figure 7:
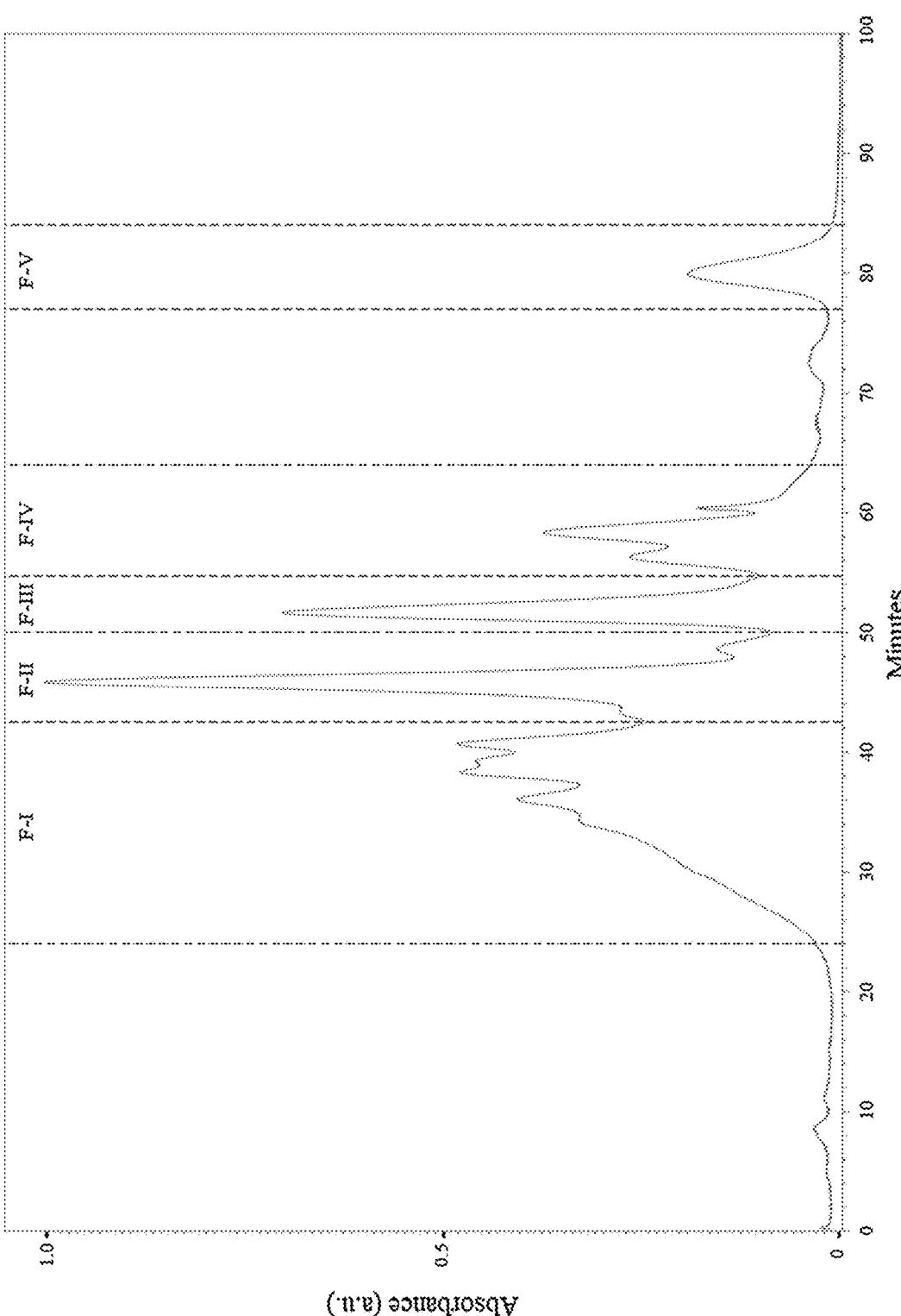
Figure 8A:
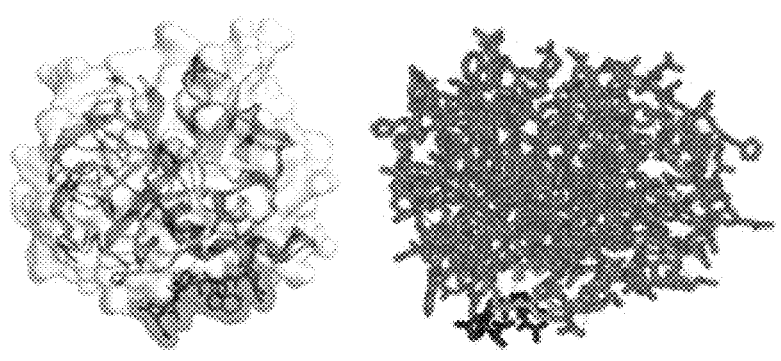
Figure 8B:
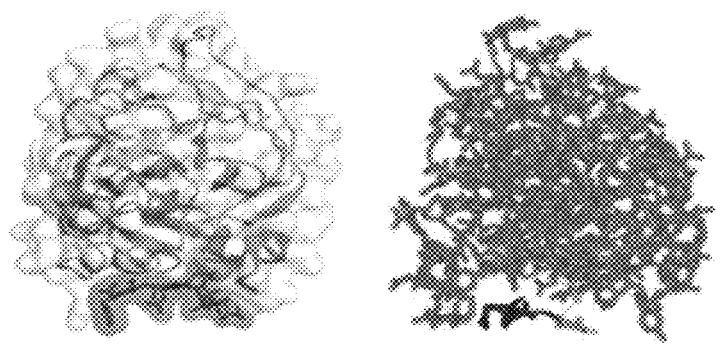
Figure 8C:
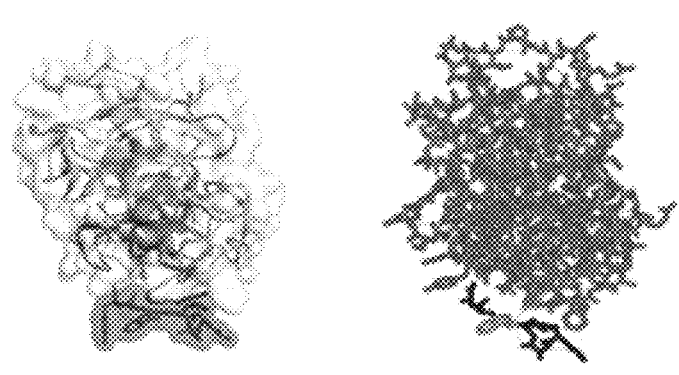
Figure 8D:
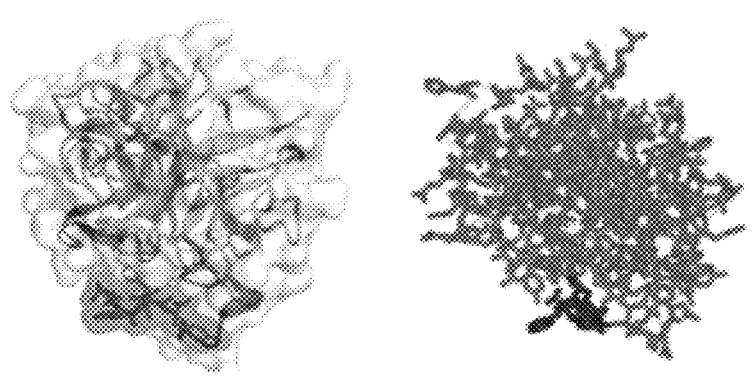
Figure 8E:
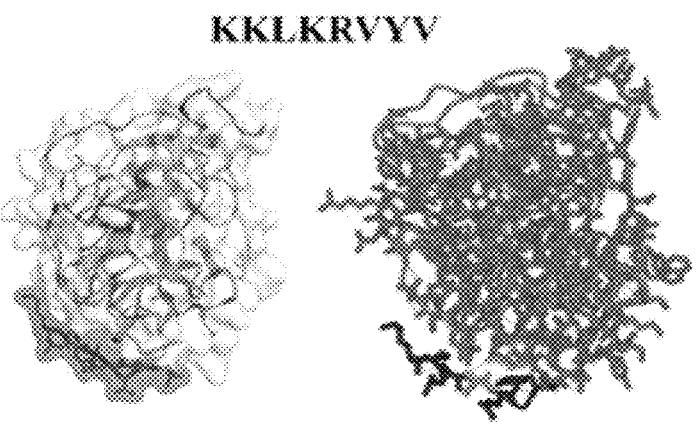
Figure 8F:
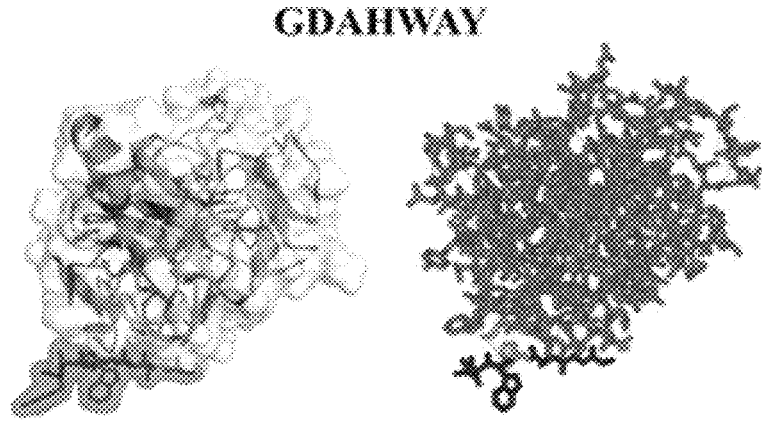
Figure 8G:
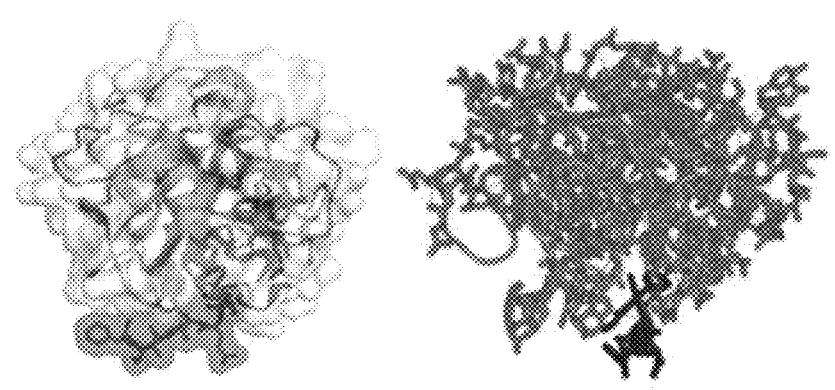

Peptides Associated with Enzyme Inhibition in the Most Active <3 kDa Peptide Fraction In order to identify the peptides associated with each enzyme inhibition, the <3 kDa peptide fraction was fractionated using size exclusion chromatography (SEC). The peptide chromatographic profile was divided into 5 fractions (FIG. 7) and collected for further evaluation. Overall, all SEC peptide fractions showed inhibitory activity towards skin aging-related enzymes, except for fraction V, which did not exhibit inhibitory activity towards collagenase (Table 5).

Fractions II (F-II) and IV (F-IV) showed the highest inhibitory activity for most of the enzymes. Particularly, F-II exhibited the highest (P<0.05) collagenase (38.01%) and elastase (55.61%) inhibitory activities; followed by F-IV with elastase (42.92%) and tyrosinase (61.81%) inhibitory activities. Interestingly, some fractions showed higher enzyme inhibitory activity compared to their counterpart <3 kDa peptide fraction. For instance, the F-II showed higher collagenase (38.01%) or elastase (55.61%) inhibitory activity compared to 28.90 and 65.32%, respectively, in the <3 kDa peptide fraction.

In Silico Analysis of Elastase-Peptide Interactions

Figure 9:
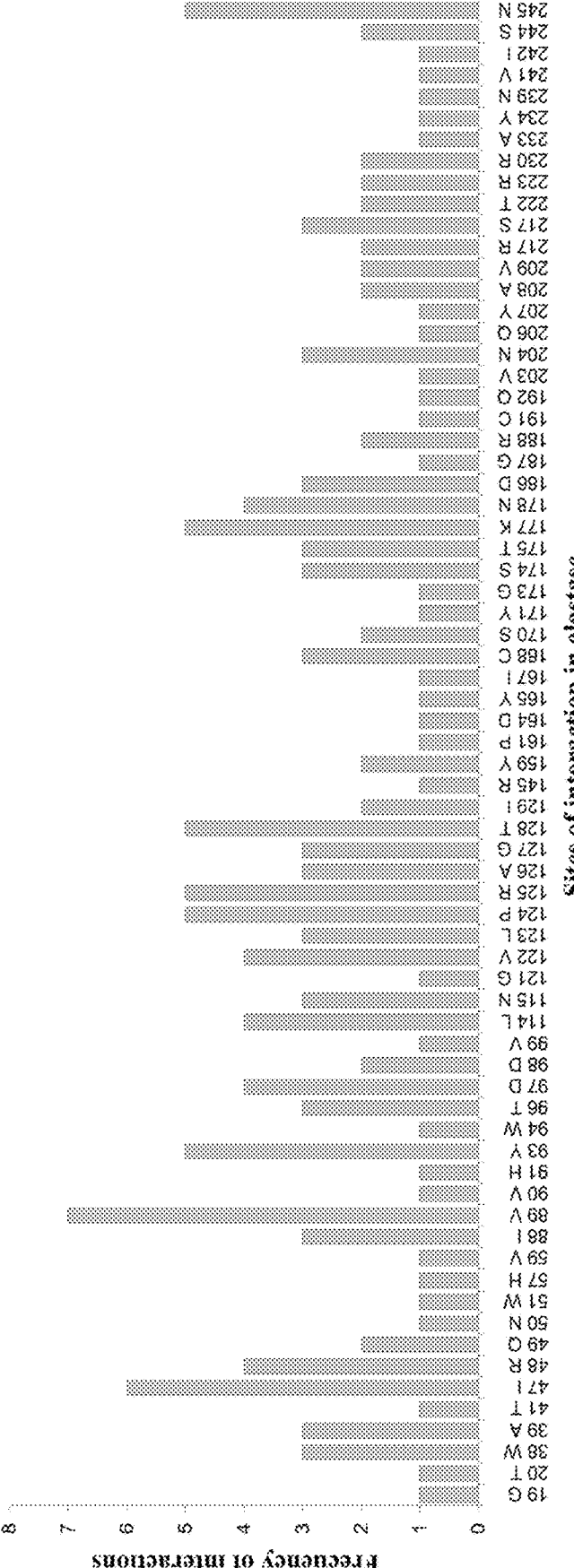
FIG. 9 shows frequency of elastase-peptide amino acid interaction sites in all molecular docking predicted models of peptide sequences obtained from the F-II chia seed peptide fraction. T3105he protein sequence showed for elastase was generated using only the amino acids that participated in all protein-peptide predicted models based on Table 2

Based on our results, the F-II was further selected to identify the peptide sequences involved in bioactivity and was subjected to docking modeling to observe the enzyme-peptide interactions. A total of seven peptides were identified in F-II, APHWYTN (SEQ ID NO: 1), DQNPRSF (SEQ ID NO: 2), GDAHWAY (SEQ ID NO: 3), GDAHWTY (SEQ ID NO: 4), GDAHWVY (SEQ ID NO: 5), GFEWITF (SEQ ID NO: 6), and KKLKRVYV (SEQ ID NO: 7). These peptides were used in docking analysis to generate predicted models of interaction between elastase and each peptide sequence (FIG. 8). These models predicted that in the interaction of elastase and the peptide sequence, between 19 to 29 pair protein-peptide residues participated (Table 6). Moreover, five peptide sequences (APHWYTN (SEQ ID NO: 1), DQNPRSF (SEQ ID NO: 2), GDAHWAY (SEQ ID NO: 3), GDAHWTY (SEQ ID NO: 4), and KKLKRVYV (SEQ ID NO: 7)) exhibited hydrogen bonding between protein-peptide residues. In addition, it is important to note that three peptide sequences share structure homology sequence (GDAHW (SEQ ID NO: 8)). In addition, we calculated the frequency of pair interactions between elastase and all seven peptides sequences obtained from F-II (FIG. 9). This graph allows us to characterize the binding sites detected in elastase and graphically analyze if they are the same for the different peptide sequences. We observed that specific elastase amino acid regions participated repeatedly in the interactions with the peptide sequences. These main regions were 38 W-49 Q, 88 I-129 I, 168 C-188 R, and 204 N-230 R. Particularly, the second region (88 I-129 I) showed interesting features by containing the elastase amino acid (89 V) with seven interactions, the highest amongst all sites. In addition, it showed a continuous sequence of interaction between the positions 121-129. In contrast, these interaction regions are close to or at least in vicinity to the active site of elastase, consisting of the amino acids 71 H, 119 D, and 214 S.

Summary and Conclusions

It is known that chia seed is a complex food composed of high polysaccharide, protein, and oil content. The implementation of ultrasonication and vacuum-filtration, successfully improved the separation of mucilage from chia seeds (7.8% yield) compared to previous extraction methods using sieves and conventional ovens. The efficient separation of mucilage followed by lipid extraction using a cold screw-press facilitated the separation of protein-rich chia seed flour. Microwave-assisted hydrolysis with alcalase and flavourzyme improved bioactivity and functionality of the CSPH in a shorter amount of time compared to conventional hydrolysis methods. CSPH from the sequential hydrolysis with microwave treatment showed overall superior in vitro antioxidant activity. Cellular antioxidant activity showed the potential antioxidant activity of these peptides for future use in vivo models, with AF-MW having the highest cellular antioxidant activity (94.8%). A positive correlation between antioxidant assays and cellular antioxidant activity was established, showing that ABTS (r=0.882) and DPPH (r=0.889) were the most efficient assays in predicting cellular antioxidant activity of CSPH. DPP-IV inhibition increased as a function of DH, suggesting that higher hydrolysis will result in improved inhibitions. DPP-IV inhibition was the highest for AF-WB (69.5%), followed by AF-MW (53.5%), suggesting the benefit of using sequential enzyme hydrolysis. For ACE inhibition, all CSPH showed improved inhibition activity compared to the control; however, no apparent influence was found regarding type of hydrolysis (water bath versus microwave) in their inhibition capacity, suggesting the structural conformation responsible of this bioactivity remains unchanged independently of the treatment applied. Lastly, further studies are required regarding the structural conformation of these peptides to fully understand their inhibition mechanism.

Applying different technologies such as those used in this study, facilitated the separation of the chia seed components. In addition, hydrolyzing the chia seed protein allowed for development of protein hydrolysates with functional and bioactive properties, which will allow for their applicability in food science or in the pharmaceutical sector.

Figure 10:
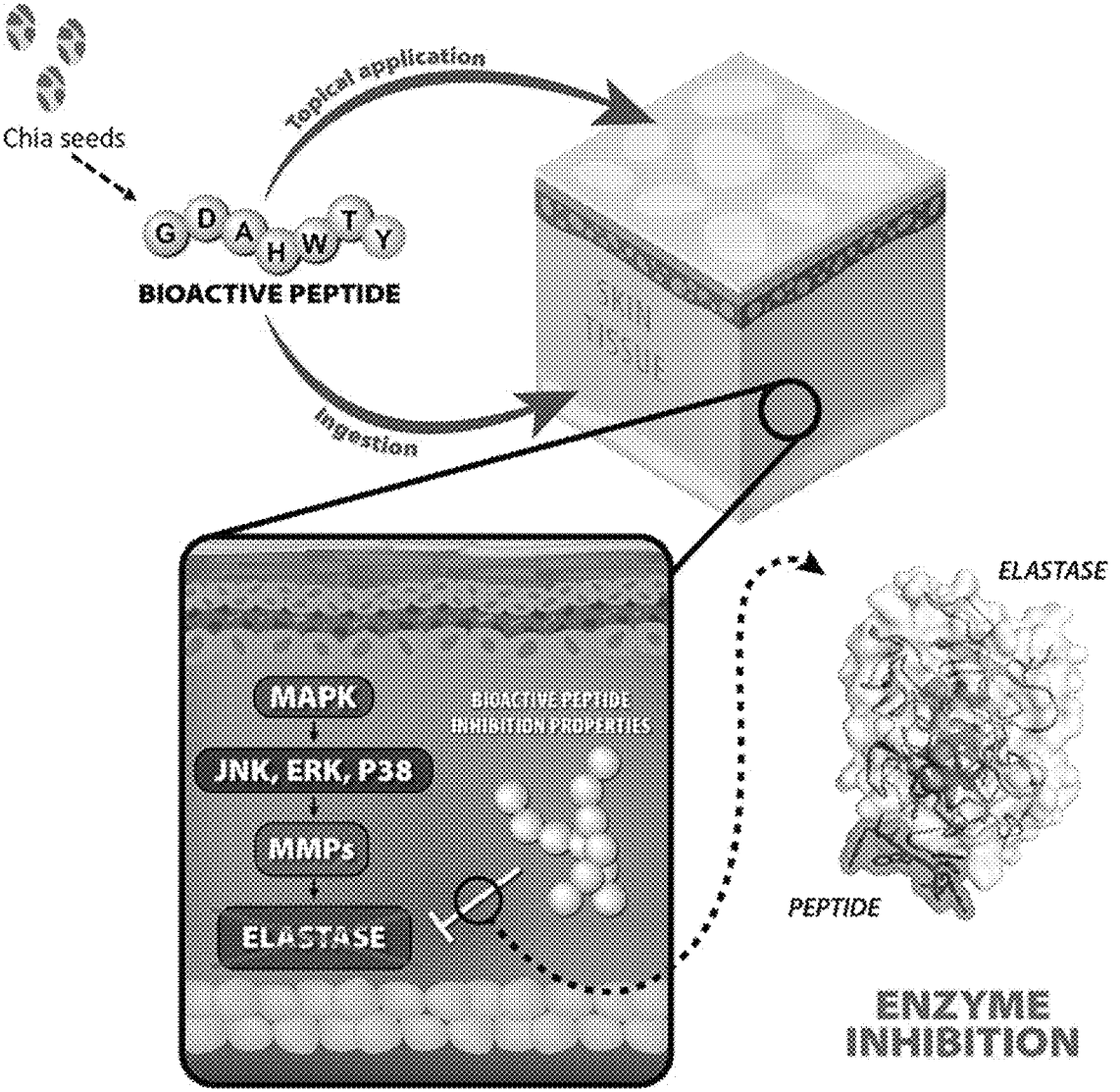
FIG. 10 shows a schematic representation of the inhibitory mechanism of chia peptides towards elastase.

To best of our knowledge, this is the first study that reports the aging-related enzyme (i.e., elastase, tyrosinase, hyaluronidase, and collagenase) inhibitory properties of chia seed peptides. Overall, our results showed that the <3 kDa peptide fraction exhibited inhibitory activity towards all enzymes tested, with mixed-type (e.g. elastase and hyaluronidase) or non-competitive (e.g. collagenase and tyrosinase) inhibition patterns. Furthermore, the peptide fraction F-II showed the highest potential for elastase inhibition. Based on in silico peptide docking analysis, chia peptide sequences identified in F-II (APHWYTN (SEQ ID NO: 1), DQNPRSF (SEQ ID NO: 2), GDAHWAY (SEQ ID NO: 3), GDAHWTY (SEQ ID NO: 4), GDAHWVY (SEQ ID NO: 5), GFEWITF (SEQ ID NO: 6), and KKLKRVYV (SEQ ID NO: 7)) could bind to either the enzyme alone and/or the enzyme-substrate complex. The inhibition occurs due to 19-29 elastase-peptide pair interactions, possibly with the active site or other recognition motifs located on the enzyme surface. Based on the docking analysis, our results suggest that chia seed peptides possess amino acids that participate during the enzymatic inhibitory process by establishing different protein-peptide pair interactions, including hydrogen bonding. In addition, three peptide sequences shared structure homology sequence (GDAHW (SEQ ID NO: 8)), which could play a predominant role in their inhibitory activity. The data suggests that these peptide sequences may contribute in the improvement of skin health by offering protection against aging-related enzymes such as elastase, by avoiding the degradation of the protein matrix of the skin (FIG. 10).

Exemplified Process

Step 1. Chia Seed Mucilage Extraction

Figure 1A:
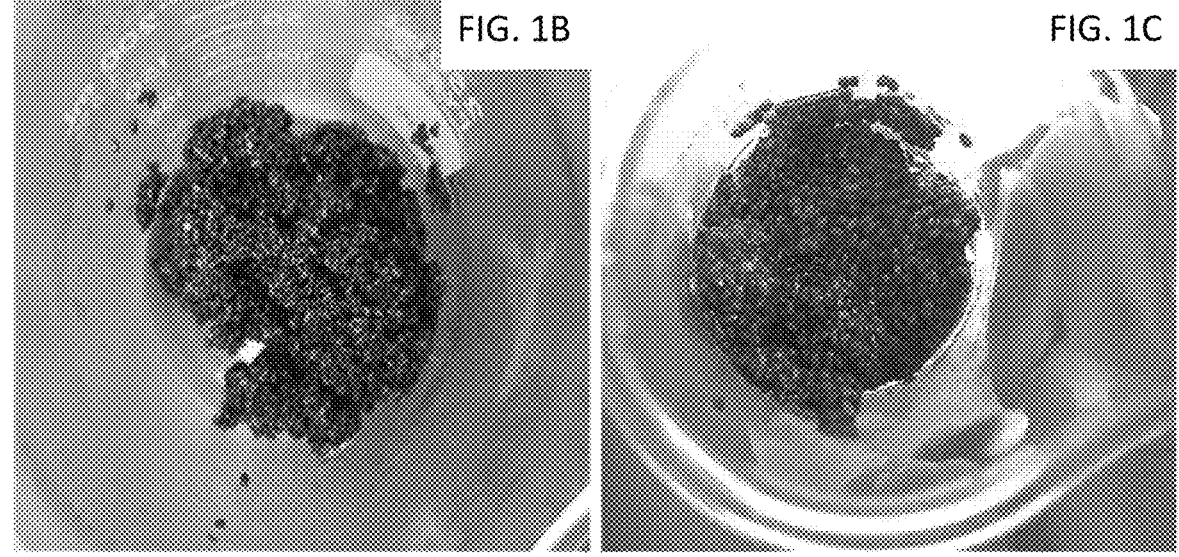

To extract the chia seed mucilage (FIG. 1), seeds are hydrated in distilled water (1:20 ratio by weight) for 24 hours, under refrigerated conditions. Preliminary studies (Table 4) helped develop an ultrasound treatment that offered successful mucilage separation. Hydrated seeds were pre-heated to 55±2° C., followed by sonication at a 75% power input using an ultrasonic cell disruptor QSonica Q500 Sonicator (QSonica LLC, Newton, CT, USA). During sonication, the temperature increased to 60±4° C. due to molecular friction. This temperature was maintained constant using double walled beaker connected to an immersion circulator control Lauda E100 water bath (Lauda-Königshofen, Germany). Seeds were separated from mucilage using vacuum-assisted filtration system.

Mucilage-free chia seeds were dried using a tray dryer (Excalibur Dehydrator 3926TCDB, Sacramento, CA) held at 40° C. for 12 h. The weight of the seeds was measured to calculate mucilage extraction yield by weight difference [Eq.12]. Finally, the mucilage solution was frozen at −85° C. and lyophilized (Labconco FreeZone 2.5 Plus, Kansas City). Dried mucilage powder was stored at 4±2° C. until used.

$$\% \text{ mucilage yield} = \qquad\qquad \text{[Eq. 12]}$$

$$\frac{\begin{pmatrix}\text{Weight of dry chia seeds}-\\ \text{Weight of dry chia seeds without mucilage}\end{pmatrix}}{\text{Weight of dry chia seeds}} \times 100$$

foaming), and bioactive (antidiabetic, antioxidant, antihypertensive) properties.

$$\text{oil yield } \% = 100 \times \frac{\begin{pmatrix}\text{Weight of chia seeds}-\\ \text{Weight of defatted chia seed flour}\end{pmatrix}}{\text{Weight of chia seeds}} \qquad \text{[Eq. 13]}$$

The oil extraction yield obtained by cold press was 28.24±0.06 g of oil/100 g of chia seeds (without mucilage). The oil content in chia seeds varies between 30-33% (Sandoval-Oliveros & Paredes-López, 2013). Cold pressing of chia seeds without mucilage allows to remove about 95.81±0.12% of the total fat of the seed. Conversely, CS with mucilage lead to an extraction of only 62.90±0.77%. This is mainly attributed to the high oil holding capacity of chia seed mucilage (Darwish, Khalifa, & El Sohaimy, 2018).

TABLE 5

Inhibitory activity of skin aging-related enzymes by size exclusion chromatography (SEC) peptide fractions obtained from <3 kDa chia seed protein hydrolysates.

| | SEC fraction | | | | |
|---|---|---|---|---|---|
| | I | II | III | IV | V |
| Skin-aging enzyme | | | % inhibition | | |
| Collagenase | 10.50 ± 3.88 a* | 38.01 ± 3.44 c | 20.13 ± 5.68 b | 22.83 ± 3.61 b | N.D. |
| Elastase | 23.85 ± 3.35 b | 55.61 ± 3.91 d | 12.79 ± 2.76 a | 42.92 ± 2.38 c | 15.98 ± 1.32 a |
| Hyaluronidase | 25.20 ± 3.81 b | 7.43 ± 1.29 a | 33.39 ± 5.96 b | 16.18 ± 2.35 a | 48.61 ± 5.19 c |
| Tyrosinase | 33.93 ± 1.82 c | 24.33 ± 2.68 b | 7.08 ± 1.78 a | 61.81 ± 3.50 d | 21.57 ± 4.36 b |

*Different lowercase letters indicate statistical differences among SEC fractions (column) for the same enzyme. N.D. Not detected. Values represent mean ± standard deviation of triplicate determinations.

TABLE 4

Mucilage extraction from chia seeds under different temperature and separation conditions.

| Temperature (° C.) | Separation method | Yield of mucilage extraction (%) |
|---|---|---|
| 55 | Vacuum-filtration | 7.66 ± 0.23 |
| 55 | Centrifugation | 6.23 ± 0.56 |
| 40 | Vacuum-filtration | 4.72 ± 0.17 |
| 40 | Centrifugation | 3.66 ± 0.17 |
| 25 | Vacuum-filtration | 3.66 ± 0.17 |
| 25 | Centrifugation | ±0.17 |

Step 2. Chia Seed Oil Extraction

Dried, mucilage-free chia seeds were defatted using a mechanical oil extraction method with a Beamnova Automatic Oil Press Machine (Commercial 304 Stainless Steel Expeller, Guangzhou, China). Seeds were pressed using a stainless-steel endless screw where the temperature of the oil extracted from the seeds was 37±2° C. Percentage of oil extraction was calculated by weight difference [Eq.13]. Hydrogen gas added to the oil held in plastic containers and stored at 4° C. The defatted chia seed flour without mucilage was subject to enzymatic hydrolysis as a way to improve protein extraction, functional (solubility, emulsion and Step 3. Chia Seed Protein Hydrolysates (CSPH)

Figure 4:
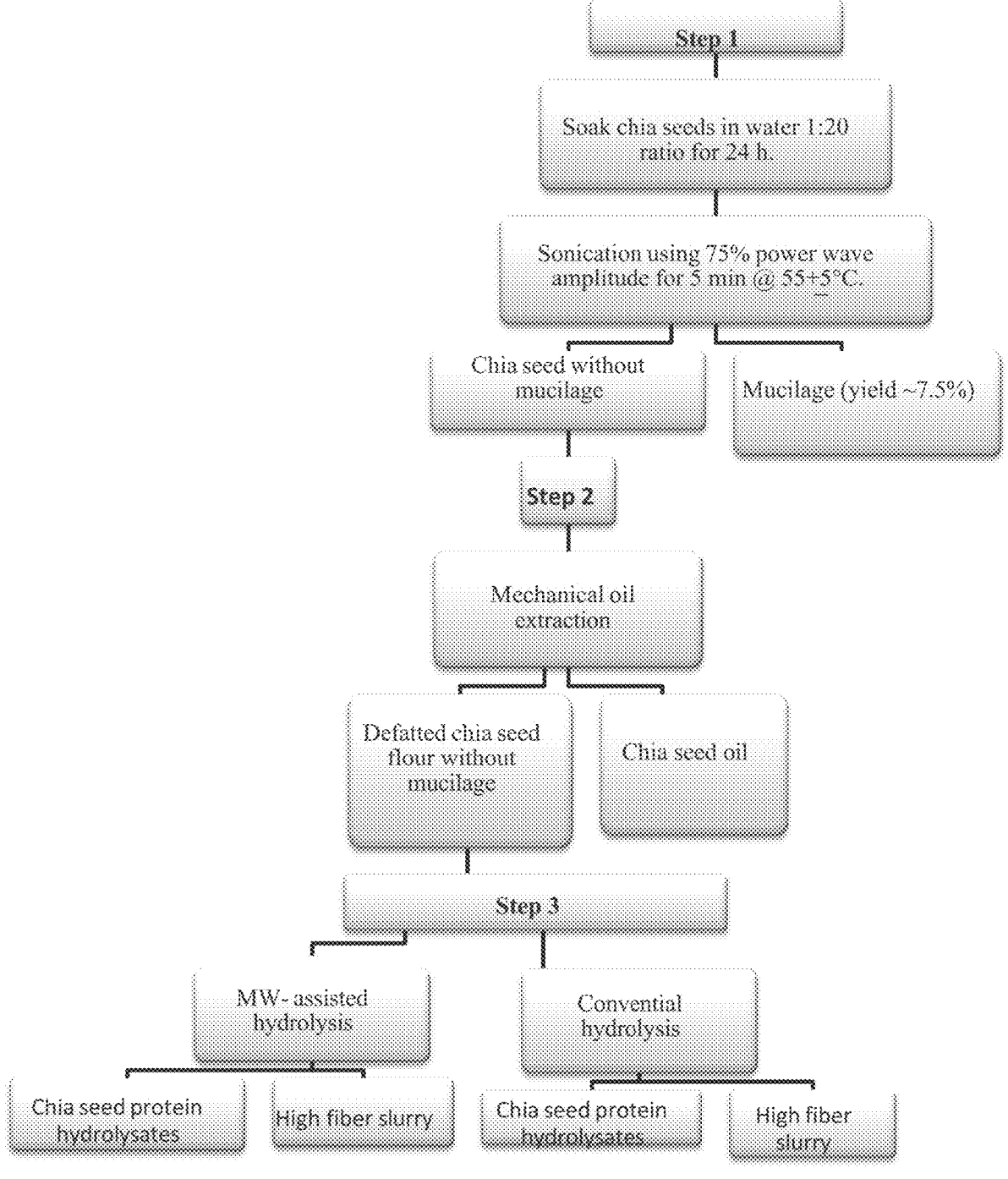

Chia flour was diluted in distilled water to obtain 22.5 mg protein/mL and homogenized using a Sorvall Omni Mixer homogenizer with a macro-attachment assembly (Norwalk, CT, U.S.A). The pH was adjusted to 8.0 using 2 M NaOH, which is the optimal condition for alcalase activity. Proteins were enzymatically hydrolyzed using single enzyme alcalase (A) or a sequential digestion with alcalase+flavourzyme (AF). Proteolysis occurred using conventional/water bath (WB) or microwave-assisted (MW) hydrolysis using a microwave accelerated reaction system (MDS, MARS-Xpress/230/60, CEM Corporation, USA). Treatments were denoted as conventional alcalase hydrolysis using a water bath (A-WB) and alcalase microwave-assisted hydrolysis (A-MW). Sequentially (AF) hydrolyzed treatments were coded as AF-WB (water bath hydrolysis) and AF-MW (microwave-assisted hydrolysis). Finally, the control (C) was non-hydrolyzed CS protein. Samples A-WB and A-MW were hydrolyzed for 1 hour with 3% (w/w) Alcalase. For sequential hydrolysis different times were used, due to the high efficiency of microwave-assisted hydrolysis the time was cut down by half to obtain similar extent of hydrolysis. AF-MW, the reaction was initiated with 2% (w/w) of Alcalase for 45 min followed by addition of 2% (w/w) of Flavourzyme for an additional 45 min. For AF-WB, the reaction was developed using 2% (w/w) of Alcalase for 90 min followed by 2% (w/w) of Flavourzyme for another 90 min. Hydrolysis was terminated by heating to 95±3° C. for 15 min. The protein slurry mixture was centrifuged at 17,636×g and the supernatant was recovered as a source of protein. The supernatant was frozen at −85° C. and lyophilized (Labconco FreeZone 2.5 Plus, Kansas City). A detailed process for the preparation of the Chia seed products (mucilage, oil, and protein) ingredients is summarized in FIG. 4.

TABLE 6

Pairs of elastase and peptide amino acids that participated in the interaction from the protein-peptide predicted model.

| No. pair | APHWYTN Enzyme residue | APHWYTN Peptide residue | DQNPRSF Enzyme residue | DQNPRSF Peptide residue | GDAHWAY Enzyme residue | GDAHWAY Peptide residue | GDAHWTY Enzyme residue | GDAHWTY Peptide residue |
|---|---|---|---|---|---|---|---|---|
| 1 | N 245 | P 2 | N 245 | Q 2 | K 177 | A 6 | R 230 | T 6 |
| 2 | V 203 | N 7 | N 239 | N 3 | T 175 | A 3 | N 178 | W 5 |
| 3 | R 125 | Y 5 | N 178 | R 5 | S 174 | W 5 | K̲ ̲1̲7̲7̲ | W̲ ̲5̲ |
| 4 | L 123* | Y 5 | D 164 | F 7 | Y 171 | H 4 | I 167 | D 2 |
| 5 | V 122 | W 4 | T 128 | S 6 | D 97 | D 2 | T 128 | T 6 |
| 6 | L 114 | Y 5 | G 127 | R 5 | T 96 | A 3 | A 126 | T 6 |
| 7 | I 47 | Y 5 | Y 93 | P 4 | V 90 | A 3 | Y 93 | H 4 |
| 8 | I 47 | A 1 | Y 93 | D 1 | V 89 | G 1 | N 204 | Y 7 |
| 9 | Q 206 | Y 5 | N 245 | N 3 | S 217 | G 1 | N 178 | D 2 |
| 10 | R 125 | T 6 | S 244 | N 3 | T 175 | H 4 | S 170 | D 2 |
| 11 | P 124 | Y 5 | A 233 | P 4 | S 174 | A 6 | T 128 | Y 7 |
| 12 | V 122 | Y 5 | Y 165 | F 7 | G 173 | H 4 | A 126 | Y 7 |
| 13 | G 121 | Y 5 | T 128 | F 7 | D 97 | A 3 | W 94 | H 4 |
| 14 | W 51 | P 2 | G 127 | S 6 | T 96 | H 4 | R 230 | W 5 |
| 15 | I 47 | P 2 | R̲ ̲1̲2̲5̲ | P̲ ̲4̲ | H 91 | W 5 | N 178 | H 4 |
| 16 | V 209 | Y 5 | Y 93 | Q 2 | V 89 | D 2 | K 177 | D 2 |
| 17 | R 125 | N 7 | S 244 | P 4 | S 217 | D 2 | I 129 | W 5 |
| 18 | P 124 | T 6 | Y 234 | Q 2 | K 177 | W 5 | T 128 | W 5 |
| 19 | L 123 | W 4 | K 177 | R 5 | T 175 | D 2 | P 124 | Y 7 |
| 20 | V 122 | H 3 | I 129 | F 7 | S 174 | H 4 | | |
| 21 | L 114 | H 3 | G 127 | F 7 | S̲ ̲1̲7̲0̲ | H̲ ̲4̲ | | |
| 22 | I 47 | H 3 | A 126 | R 5 | D 97 | G 1 | | |
| 23 | | | Y 93 | N 3 | T 96 | D 2 | | |
| 24 | | | | | V 89 | A 3 | | |

| No. pair | GDAHWVY Enzyme residue | GDAHWVY Peptide residue | GFEWITF Enzyme residue | GFEWITF Peptide residue | KKLKRVYV Enzyme residue | KKLKRVYV Peptide residue |
|---|---|---|---|---|---|---|
| 1 | N 245 | D 2 | R 217 | F 2 | R 223 | V 8 |
| 2 | V 209 | H 4 | C 191 | F 2 | T 222 | Y 7 |
| 3 | Y 207 | G 1 | D 98 | W 4 | G 187 | Y 7 |
| 4 | R 125 | D 2 | V 89 | T 6 | D 186 | R 5 |
| 5 | L 123 | H 4 | V 89 | E 3 | C 168 | V 6 |
| 6 | N 115 | H 4 | I 88 | W 4 | Y 159 | K 4 |
| 7 | L 114 | W 5 | T 41 | W 4 | G 19 | K 1 |
| 8 | Q 49 | V 6 | A 39 | G 1 | T 222 | V 8 |
| 9 | R 48 | H 4 | W 38 | G 1 | R 188 | K 2 |
| 10 | I 47 | H 4 | R 217 | E 3 | D 186 | Y 7 |
| 11 | N 245 | A 3 | Q 192 | F 2 | C 168 | Y 7 |
| 12 | V 241 | Y 7 | V 99 | W 4 | P 161 | K 4 |
| 13 | A 208 | G 1 | D 97 | F 2 | T 20 | K 1 |
| 14 | N 204 | D 2 | V 89 | W 4 | R 223 | Y 7 |
| 15 | P 124 | D 2 | I 88 | T 6 | R 188 | K 4 |
| 16 | N 115 | W 5 | H 57 | W 4 | G 187 | K 4 |
| 17 | L 114 | V 6 | A 39 | F 2 | D 186 | K 4 |
| 18 | Q 49 | Y 7 | W 38 | W 4 | C̲ ̲1̲6̲8̲ | R̲ ̲5̲ |
| 19 | R 48 | W 5 | S 217 | F 2 | Y 159 | L 3 |
| 20 | I 47 | W 5 | R 145 | G 1 | | |
| 21 | I 242 | A 3 | D 98 | F 2 | | |
| 22 | A 208 | H 4 | V 89 | I 5 | | |
| 23 | N 204 | H 4 | I 88 | F 7 | | |
| 24 | P 124 | H 4 | V 59 | F 7 | | |
| 25 | V 122 | H 4 | A 39 | W 4 | | |
| 26 | N 115 | G 1 | W 38 | I 5 | | |
| 27 | N 50 | Y 7 | | | | |
| 28 | R 48 | Y 7 | | | | |
| 29 | R 48 | A 3 | | | | |

*The bold, underlined pairs represent the amino acids that participated in hydrogen bonding observed in the FIG. 8.

While this invention has been described as having an exemplary design, the present invention may be further modified within the spirit and scope of this disclosure. This application is therefore intended to cover any variations, uses, or adaptations of the invention using its general principles.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

REFERENCES CITED

1. Aluko and Monu, 2003, Journal of Food Science, 68 (4) (2003), pp. 1254-1258
2. Amagliani et al., 2019, Journal of Cereal Science, 88 (2019), pp. 16-23
3. Aruoma, 2003, Mutation Research: Fundamental and Molecular Mechanisms of Mutagenesis, 523 (2003), pp. 9-20
4. Avila-De La Rosa et al., 2015, Food Hydrocolloids, 49 (2015), pp. 200-207
5. Azmi N, Hashim P, Hashim D M, Halimoon N, Majid N M N, 2014, Asian Pac J Trop Biomed 4 (Suppl 1) (2014): S348-S352.
6. Balti et al., 2010, Journal of the Science of Food and Agriculture, 90 (12) (2010), pp. 2006-2014
7. View Record in ScopusGoogle Scholar
8. Bersuder et al., 1998, Journal of the American Oil Chemists Society, 75 (2) (1998), pp. 181-187
9. Campos et al., 2016, LWT-Food Science and Technology, 65 (2016), pp. 874-883
10. Capitani et al., 2013, Journal of the Science of Food and Agriculture, 93 (15) (2013), pp. 3856-3862
11. Chemat et al., 2017, Ultrasonics Sonochemistry, 34 (2017), pp. 540-560
12. Chobert et al., 1988, Journal of Agricultural and Food Chemistry, 36 (5) (1988), pp. 883-892
13. Conradi et al., 1991, Pharmaceutical Research, 8 (12) (1991), pp. 1453-1460
14. Delgado et al., 2016, Food Chemistry, 197 (2016), pp. 1160-1167
15. Facino R M, Carini M, Stefani R, Aldini G, Saibene L (1995), Arch Pharm 328 (10): 720-724
16. Hall et al., 2018, Food Chemistry, 262 (2018), pp. 39-47
17. Hall et al., 2017, Food Chemistry, 224 (2017), pp. 414-422
18. Hong G P, Min S G, Jo Y J, 2019, Molecules (2019) 24 (6): 1104
19. Kang et al., 2019, International Journal of Biological Macromolecules, 124 (2019), pp. 1137-1144
20. Ketnawa and Liceaga, 2017, Food and Bioprocess Technology, 10 (3) (2017), pp. 582-591
21. Ketnawa et al., 2019, International Journal of Food Science and Technology, 54 (4) (2019), pp. 1062-1073
22. Klost and Drusch, 2019, Food Hydrocolloids, 86 (2019), pp. 134-140
23. Kurcinski M, Jamroz M, Blaszczyk M, Kolinski A, Kmiecik S, 2015, Nucleic Acids Res (2015) 43:419-424
24. Lacroix and Li-Chan, 2015, Peptides, 69 (2015), pp. 19-25
25. Li-Chan et al., 2012, Journal of Agricultural and Food Chemistry, 60 (4) (2012), pp. 973-978
26. Liceaga-Gesualdo and Li-Chan, 1999, Journal of Food Science, 64 (6) (1999), pp. 1000-1004
27. Malaypally et al., 2015, Journal of Functional Foods, 18 (2015), pp. 1158-1166
28. Marques et al., 2015, Food Chemistry, 168 (2015), pp. 288-293
29. Martínez-Hernández et al., 2017, Jóvenes En La Ciencia, 3 (1) (2017), pp. 139-143
30. Matsui et al., 1999, Zeitschrift für Naturforschung C, 54 (3-4) (1999), pp. 259-263
31. Mikhaylin et al., 2017, ACS Sustainable Chemistry & Engineering, 5 (12) (2017), pp. 11706-11714
32. Mohd Ali et al., 2012, Journal of Biomedicine and Biotechnology, 2012 (2012)
33. Monroy-Torres et al., 2008, Revista Salud Pública Y Nutrición, 9 (1) (2008), pp. 1-9
34. Muñoz et al., 2012, Journal of Food Engineering, 108 (1) (2012), pp. 216-224
35. Nguyen et al., 2017, Fisheries Science, 83 (2) (2017), pp. 317-331
36. Nieman et al., 2012, Journal of Alternative & Complementary Medicine, 18 (7) (2012), pp. 700-708
37. Nongonierma et al., 2015, Journal of Cereal Science, 65 (2015), pp. 112-118
38. Olivos-Lugo et al., 2010, Food Science and Technology International, 16 (1) (2010), pp. 89-96
39. Orona-Tamayo et al., 2015, Lebensmittel-Wissenschaft und-Technologie-Food Science and Technology, 64 (1) (2015), pp. 236-242
40. Ou et al., 2001, Journal of Agricultural and Food Chemistry, 49 (10) (2001), pp. 4619-4626
41. Pacheco-Aguilar et al., 2008, Food Chemistry, 109 (4) (2008), pp. 782-789
42. Pearce and Kinsella, 1978, Journal of Agricultural and Food Chemistry, 26 (3) (1978), pp. 716-723
43. Pereira et al., 2019, Ultrasonics Sonochemistry, 55 (2019), pp. 332-340
44. Sandoval-Oliveros and Paredes-López, 2013, Journal of Agricultural and Food Chemistry, 61 (1) (2013), pp. 193-201
45. Sarmadi and Ismail, 2010, Peptides, 31 (10) (2010), pp. 1949-1956
46. Segura-Campos et al., 2014, Agricultural Sciences, 05 (03) (2014), pp. 220-226
47. Segura-Campos et al., 2013, International Journal of Jood Science (2013), pp. 1-8
48. da Silva Marineli et al., 2015, Food Research International, 76 (2015), pp. 666-674
49. Singh et al., 2013, Biomolecules, 3 (1) (2013), pp. 168-179
50. Timilsena et al., 2016, Food Chemistry, 212 (2016), pp. 648-656
51. Uluko et al., 2013, International Journal of Food Science and Technology, 48 (11) (2013), pp. 2250-2257

52. Urbizo-Reyes U C, San Martin-González MF, Garcia-Bravo J, López Malo A, Liceaga A M, 2019, Food Hydrocoll (2019) 97:105187.

53. Velarde-Salcedo et al., 2013, Food Chemistry, 136 (2) (2013), pp. 758-764

54. van der Ven et al., 2001, Journal of Agricultural and Food Chemistry, 49 (10) (2001), pp. 5005-5012

55. Vilkhu et al., 2008, Innovative Food Science & Emerging Technologies, 9 (2) (2008), pp. 161-169

56. Villanueva et al., 2019, Food Hydrocolloids, 90 (2019), pp. 472-481

57. Waniska and Klinsella, 1979, Journal of Food Science, 44 (5) (1979), pp. 1398-1402

58. Wan et al., 2015, Food Chemistry, 175 (2015), pp. 601-608

59. Wolfe and Liu, 2007, Journal of Agricultural and Food Chemistry, 55 (22) (2007), pp. 8896-8907

60. K. L. Wolfe, X. Kang, X. He, M. Dong, Q. Zhang, R. H. Liu, Journal of Agricultural and Food Chemistry, 56 (18) (2008), pp. 8418-8426

61. J. F. Zayas, Functionality of proteins in food, Springer Science & Business Media (2012)

62. Zhang et al., 2019, Food Hydrocolloids, 93 (2019), pp. 189-197

63. Zhao et al., 2012. Food Chemistry, 134 (3) (2012), pp. 1360-1367.

```
SEQUENCE LISTING

Sequence total quantity: 8
SEQ ID NO: 1            moltype = AA  length = 7
FEATURE                Location/Qualifiers
source                 1..7
                       mol_type = protein
                       organism = synthetic construct
SEQUENCE: 1
APHWYTN                                                            7

SEQ ID NO: 2            moltype = AA  length = 7
FEATURE                Location/Qualifiers
source                 1..7
                       mol_type = protein
                       organism = synthetic construct
SEQUENCE: 2
DQNPRSF                                                            7

SEQ ID NO: 3            moltype = AA  length = 7
FEATURE                Location/Qualifiers
source                 1..7
                       mol_type = protein
                       organism = synthetic construct
SEQUENCE: 3
GDAHWAY                                                            7

SEQ ID NO: 4            moltype = AA  length = 7
FEATURE                Location/Qualifiers
source                 1..7
                       mol_type = protein
                       organism = synthetic construct
SEQUENCE: 4
GDAHWTY                                                            7

SEQ ID NO: 5            moltype = AA  length = 7
FEATURE                Location/Qualifiers
source                 1..7
                       mol_type = protein
                       organism = synthetic construct
SEQUENCE: 5
GDAHWVY                                                            7

SEQ ID NO: 6            moltype = AA  length = 7
FEATURE                Location/Qualifiers
source                 1..7
                       mol_type = protein
                       organism = synthetic construct
SEQUENCE: 6
GFEWITF                                                            7

SEQ ID NO: 7            moltype = AA  length = 8
FEATURE                Location/Qualifiers
source                 1..8
                       mol_type = protein
                       organism = synthetic construct
SEQUENCE: 7
KKLKRVYV                                                           8

SEQ ID NO: 8            moltype = AA  length = 5
FEATURE                Location/Qualifiers
source                 1..5
                       mol_type = protein
```

-continued organism = synthetic construct

SEQUENCE: 8
GDAHW                                                        5

The invention claimed is:

1. A process for manufacturing a plurality of products from chia seeds comprising the steps of:
   a. soaking chia seeds in about 10 to 20 volumes of water for a period of time;
   b. sonicating soaked chia seeds using 75% power input for about 5 minutes at an elevated temperature to afford a mixture;
   c. separating chia seeds from said mixture by vacuum filtration to afford a solution, which is lyophilized to afford a mucilage product of chia seeds, a soluble fiber product;
   d. drying and defatting mucilage-removed chia seeds;
   e. hydrolyzing the defatted chia seeds in an aqueous solution in presence an enzyme;
      wherein the defatted chia seeds do not comprise mucilage; and
      wherein the protein hydrolysate of chia seeds is resolved into a plurality of fractions comprising biologically active peptides having a sequence of SEQ ID NO: 1, 2, 3, 4, 5, 6, 7, or 8.

2. The process according to claim 1 wherein the step of hydrolyzing the flour of defatted chia seeds in an aqueous solution in presence an enzyme is performed at a pH of about 6-8.

3. The process according to claim 1, wherein said hydrolyzing is microwave-assisted.

4. The process according to claim 2, wherein said enzyme is alcalase, optionally together with flavourzyme.

5. The process according to claim 1, wherein said hydrolyzing affords a solid product and a solution product after separation, wherein said solid product is an insoluble fiber product of chia seed and said solution product is a protein hydrolysate of chia seeds.

6. The process according to claim 5, wherein said protein hydrolysate of chia seeds is further resolved into a plurality of fractions comprising biologically active proteins and peptides.

7. The process according to claim 1, wherein said elevated temperature ranges from about 30° C to about 70° C.

* * * * *